(12) United States Patent
Seo et al.

(10) Patent No.: US 12,366,885 B2
(45) Date of Patent: Jul. 22, 2025

(54) ELECTRONIC DEVICE AND METHOD INCLUDING FLEXIBLE DISPLAY

(71) Applicant: SAMSUNG ELECTRONICS CO., LTD., Suwon-si (KR)

(72) Inventors: Soohyun Seo, Suwon-si (KR);
Myunghoon Kwak, Suwon-si (KR);
Jooyoung Kang, Suwon-si (KR);
Hyunsuk Kim, Suwon-si (KR);
Sanghyuk Park, Suwon-si (KR);
Jihyung Jung, Suwon-si (KR);
Joungmin Cho, Suwon-si (KR);
Nakhyun Choi, Suwon-si (KR);
Hyunju Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 457 days.

(21) Appl. No.: 17/975,341

(22) Filed: Oct. 27, 2022

(65) Prior Publication Data
US 2023/0040057 A1 Feb. 9, 2023

Related U.S. Application Data

(63) Continuation of application No. PCT/KR2021/016019, filed on Nov. 5, 2021.

(30) Foreign Application Priority Data

Nov. 6, 2020 (KR) .......................... 10-2020-0148063
Mar. 11, 2021 (KR) .......................... 10-2021-0032181

(51) Int. Cl.
*G06F 1/16* (2006.01)

(52) U.S. Cl.
CPC .......... *G06F 1/1624* (2013.01); *G06F 1/1652* (2013.01)

(58) Field of Classification Search
CPC ...... G06F 1/1652; G06F 1/206; G06F 1/1624; G06F 1/1656; G06F 1/1677;
(Continued)

(56) References Cited

U.S. PATENT DOCUMENTS 8,516,728 B2 8/2013 Jung et al.
9,693,391 B2 6/2017 Jang et al.
(Continued)

FOREIGN PATENT DOCUMENTS

CN 109799876 5/2019
JP 2016-43340 A 4/2016
(Continued)

OTHER PUBLICATIONS

International Search Report for PCT/KR2021/016019 dated Mar. 2, 2022, 4 pages.
(Continued)

*Primary Examiner* — Chun Cao
(74) *Attorney, Agent, or Firm* — Nixon & Vanderhye P.C.

(57) ABSTRACT

An electronic device according to various example embodiments may include a housing including a first housing and a second housing slidably coupled to the first housing within a specific range, a heating part disposed to at least one region of the first housing and second housing, a driving unit disposed to one region in the housing, a flexible display which may include a first portion exposed for view (visible to a user) to the outside of the housing and a second portion extending from the first portion and inserted into the housing or drawn out to the outside when the second housing moves with respect to the first housing, a support structure, at least one temperature sensor, and at least one processor. The at least one processor is configured to sense a temperature and at least control a movement speed of the second housing based on at least the sensed temperature.

20 Claims, 38 Drawing Sheets

(58) Field of Classification Search
CPC .... G06F 1/1684; G06F 1/1616; G06F 1/1641;
G06F 1/1679; G06F 1/1681; G06F
12/0811; G06F 12/0866; G06F 12/123;
G06F 13/18; G06F 2203/04102; G06F
2212/7201; G06F 3/0604; G06F 3/061;
G06F 3/0626; G06F 3/0655; G06F
3/0656; G06F 3/0658; G06F 3/0659;
G06F 3/0679; G06F 3/068; H04M
1/0235; H04M 1/0268; H04M 1/72454;
H04M 2250/12; Y02D 10/00
USPC ..................................................... 700/299
See application file for complete search history.

(56) References Cited

U.S. PATENT DOCUMENTS

| | | | |
|---|---|---|---|
| 10,067,528 | B2 | 9/2018 | Lee et al. |
| 10,747,269 | B1 | 8/2020 | Choi et al. |
| 11,935,445 | B2* | 3/2024 | Min ................ G06F 1/1677 |
| 2016/0062412 | A1 | 3/2016 | Park et al. |
| 2016/0307545 | A1 | 10/2016 | Lee et al. |
| 2017/0064879 | A1 | 3/2017 | Lee et al. |
| 2018/0107306 | A1 | 4/2018 | Hong et al. |
| 2018/0164854 | A1 | 6/2018 | Wood et al. |
| 2019/0042014 | A1 | 2/2019 | Ohata et al. |
| 2019/0069451 | A1 | 2/2019 | Myers et al. |
| 2020/0033913 | A1 | 1/2020 | Yang |
| 2020/0090628 | A1 | 3/2020 | Park et al. |
| 2021/0400852 | A1 | 12/2021 | Kim |
| 2022/0113766 | A1* | 4/2022 | Cho ................ G06F 1/1624 |

FOREIGN PATENT DOCUMENTS

| | | |
|---|---|---|
| JP | 6151253 B2 | 6/2017 |
| KR | 10-2014-0143638 A | 12/2014 |
| KR | 10-2016-0123201 | 10/2016 |
| KR | 10-2017-0024204 | 3/2017 |
| KR | 10-2018-0043433 | 4/2018 |
| KR | 10-2018-0134236 A | 12/2018 |
| KR | 10-2066569 B1 | 1/2020 |
| KR | 10-2111376 B1 | 5/2020 |
| KR | 10-2020-0064573 | 6/2020 |
| KR | 10-2020-0064573 A | 6/2020 |
| WO | 2020/096153 | 5/2020 |
| WO | WO2020096153 A1 | 5/2020 |
| WO | 2020/111793 | 6/2020 |
| WO | WO 2020/211948 A1 | 10/2020 |

OTHER PUBLICATIONS

Extended European Search Report dated Jan. 2, 2024 for EP Application No. 21889610.8.

* cited by examiner

ELECTRONIC DEVICE AND METHOD INCLUDING FLEXIBLE DISPLAY

CROSS-REFERENCE TO RELATED APPLICATIONS

This application is a continuation of International Application No. PCT/KR2021/016019 designating the United States, filed on Nov. 5, 2021, in the Korean Intellectual Property Receiving Office and claiming priority to Korean Patent Application Nos. 10-2020-0148063 filed on Nov. 6, 2020 and 10-2021-0032181 filed on Mar. 11, 2021, the disclosures of which are incorporated by reference herein in their entireties.

BACKGROUND

Field

The disclosure relates to an electronic device including a flexible display, and a method thereof.

Description of Related Art

Portable electronic devices have progressed in various forms to secure an extended display region without affecting portability. For example, the electronic device may have a slide-type structure which is unfolded in a mutually sliding manner when used at a position where a first housing and a second housing overlap. In addition, an electronic device having the slide-type structure may be implemented in various forms (e.g., a rollable or slidable type) in which a display region viewable from the outside by a user can be extended using a flexible display.

In the conventional bar-type electronic device, there is no change in a screen region of a display viewable from the outside. However, in an electronic device including a flexible display, a display region viewable from the outside may change with rolling or sliding of the flexible display according to a usage state of the electronic device. Accordingly, in the flexible display, a repulsive force may occur in a variable region which changes in shape physically.

In a case of using a rollable or slidable electronic device, the entire or a significant region of a flexible display may change in shape physically according to a usage state, which may cause occurrence of a repulsive force in an overall region or in at least part of a region of the flexible display. Accordingly, when the rollable or slidable electronic device is used at a low temperature (e.g., below about −5° C.) which affects the repulsive force, a crack may occur in the flexible display, or furthermore, driving of the electronic device may be impaired.

SUMMARY

Various example embodiments disclosed in the disclosure can provide an electronic device capable of maintaining an appropriate temperature by controlling driving of a flexible display according to an ambient temperature of the flexible display, e.g., of the rollable or slidable electronic device, and/or by controlling power supplied to electronic parts disposed inside the electronic device.

According to various example embodiments of the disclosure, there is provided an electronic device including a housing including a first housing of a side face and rear face of the electronic device and a second housing slidably coupled to the first housing within a specific range, a heating part disposed to at least one region of the first housing and second housing, a driving unit (e.g., comprising at least one of a roller, a bar, and/or a motor) disposed to one region in the housing, a flexible display of which at least one region is viewable from the outside of the electronic device through the front face of the electronic device and which includes a metal plate, wherein the flexible display includes a first portion exposed for view to the outside of the housing and a second portion extending from the first portion and inserted into the housing or drawn out to the outside when the second housing moves with respect to the first housing so that at least part of the second portion of the flexible display can be selectively moved from a position exposed for view by a user and a position not exposed for view by a user based on movement of the second housing, a support structure attached to a rear face of the second portion, at least one temperature sensor disposed at least partially inside the housing, and at least one processor electrically coupled to at least one of the heating part, the driving unit, the flexible display, the support structure, and/or the temperature sensor. The at least one processor may be configured to determine a temperature at least proximate a region in which the second portion of the flexible display is disposed through the at least one temperature sensor, determine whether an event for moving the second housing occurs, based on determination of the event for moving the second housing, control a movement speed of the second housing to a first driving speed, based on at least the sensed temperature being greater than or equal to a first temperature, based on determination of the event for moving the second housing, control the movement speed of the second housing to a second driving speed different from the first driving speed and/or restrict a movement of the second housing, based on at least the sensed temperature being less than the first temperature, and supply a first power to at least one of the heating part, the driving unit, the metal plate, and the support structure.

According to various embodiments of the disclosure, there is provided a method of operating an electronic device including a housing including a first housing and a second housing movable with respect to the first housing, and a flexible display having a first portion exposed for view to the outside of the housing and a second portion extending from the first potion. The method may include sensing an ambient temperature at a region where the second portion of the flexible display is disposed through a temperature sensor disposed inside the electronic device, determining whether an event for moving the second housing occurs, controlling a movement speed of the second housing to a first driving speed, if the sensed temperature is greater than or equal to a first temperature at the occurrence of the event for moving the second housing, control the movement speed of the second housing to a second driving speed different from the first driving speed or restrict a movement of the second housing, if the event for moving the second housing occurs and the sensed temperature is less than the first temperature, and supplying a first power to at least one of a heating part disposed to at least one region of the first housing and second housing, a driving unit disposed to one region in the housing, a metal plate included in the flexible display, and a support structure attached to a rear face of the second portion.

According to various embodiments disclosed in the disclosure, when a rollable and/or slidable electronic device is used at a low temperature, damage such as cracking of a flexible display can be reduced or prevented, thereby improving durability of the flexible display.

According to various embodiments disclosed in the disclosure, when driving of the flexible display of the rollable or slidable electronic device is restricted, a user can recognize this, thereby improving user's convenience.

BRIEF DESCRIPTION OF DRAWINGS

In relation to the description of the drawings, the same or similar reference numerals may be used with respect to the same or similar elements. Additionally, the above and other aspects, features and advantages of certain embodiments of the present disclosure will be more apparent from the following detailed description, taken in conjunction with the accompanying drawings, in which.

Any of the embodiment(s) described herein may be used in conjunction with any other embodiment(s) described herein.

DETAILED DESCRIPTION

Figure 1:
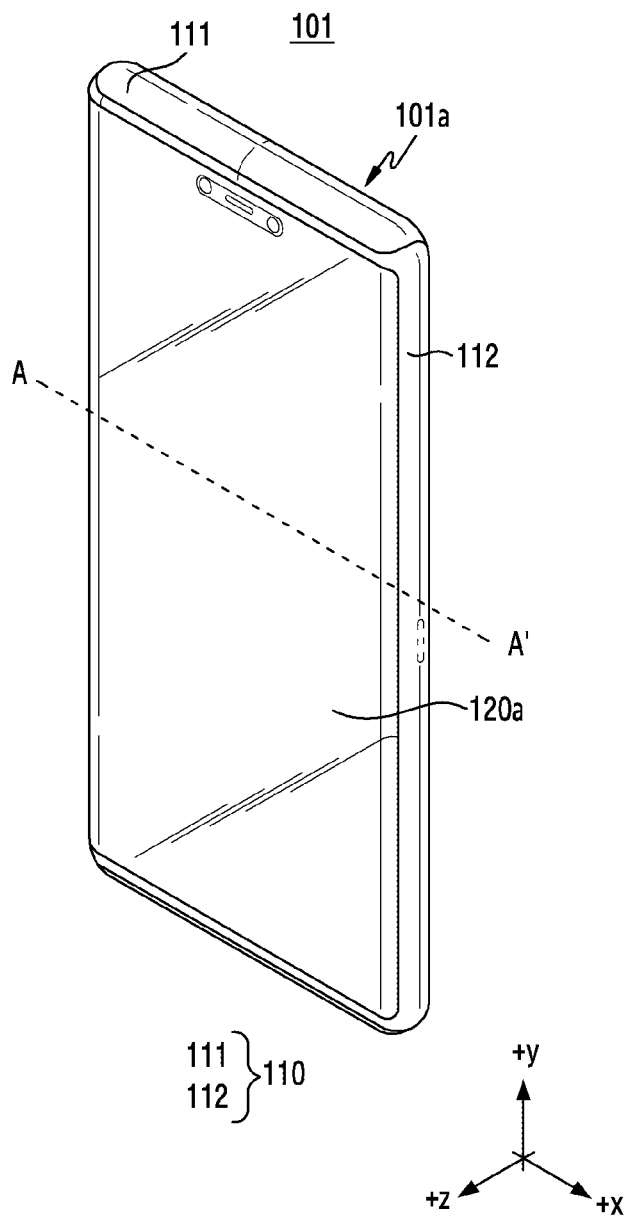
FIG. 1 is a front perspective view illustrating an electronic device in a first state (e.g., a reduced state), according to an embodiment.
Figure 2:
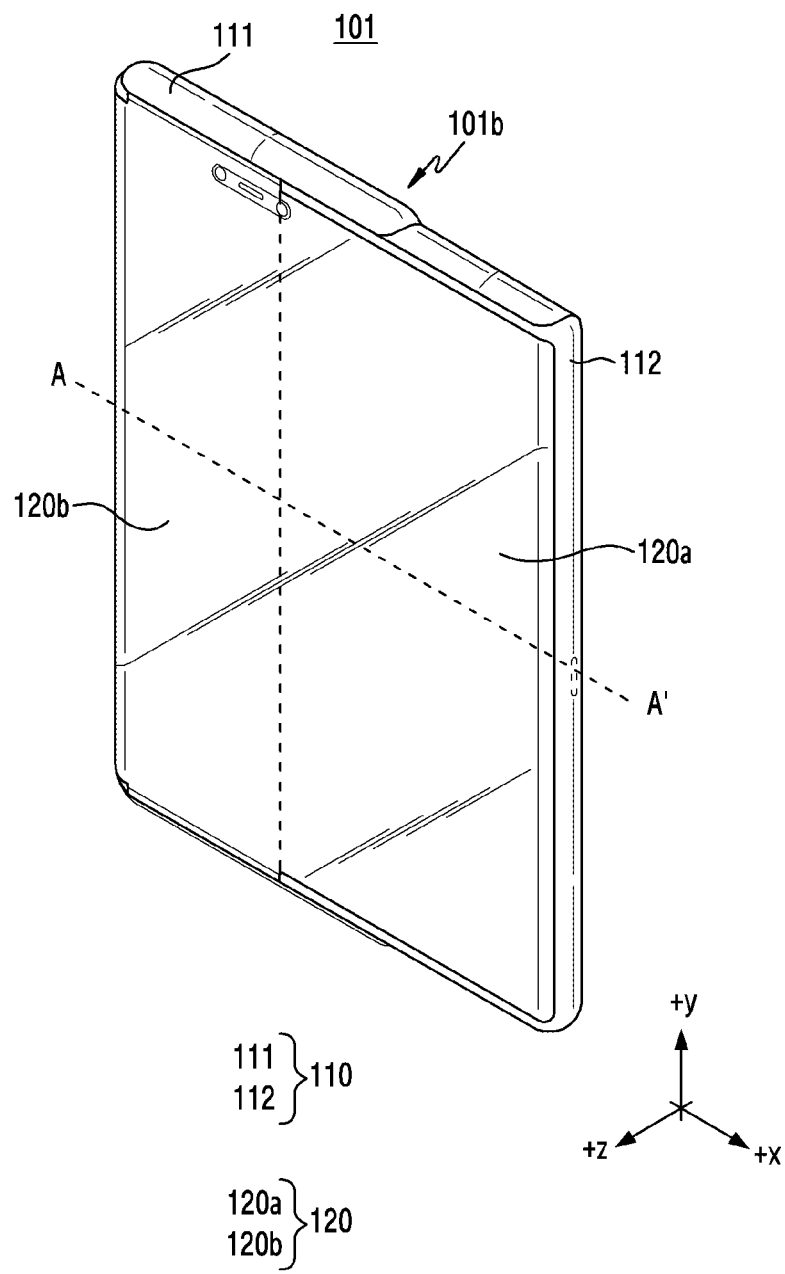
FIG. 2 is a front perspective view illustrating an electronic device in a second state (e.g., an extended state), according to an embodiment.

FIG. 1 is a front perspective view illustrating an electronic device 101 in a first state (e.g., a reduced state), according to an example embodiment. FIG. 2 is a front perspective view illustrating the electronic device 101 in a second state (e.g., an extended state), according to an embodiment.

Any of the embodiment(s) described herein may be used in conjunction with any other embodiment(s) described herein.

According to various example embodiments, a face facing substantially the same direction as a direction faced by at least part (e.g., a first portion 120a) of a flexible display 120 located outside the electronic device 101 may be defined as a front face (or a forward side) of the electronic device 101 and may be designed to face a user(s), and a face opposite to the front face may be defined as a rear face (or a backward side) of the electronic device 101. A face surrounding a space between the front face and the rear face may be a side face of the electronic device 101.

The flexible display 120 may be disposed in at least part of the electronic device 101 according to an example embodiment. In an example embodiment, the flexible display 120 may include at least part of a flat shape and at least part of a curved shape. In an embodiment, the flexible display 120 and a slidable housing 110 surrounding at least part of an edge of the flexible display 120 may be disposed to and/or proximate the front face of the electronic device 101.

In an example embodiment, the slidable housing 110 may constitute at least part of a region of the front face of the electronic device 101 (e.g., a face of the electronic device 101 facing a +z direction of FIG. 1 and FIG. 2), the rear face thereof (e.g., a face of the electronic device 101 facing a −z direction of FIG. 1 and FIG. 2), and/or a side face thereof (e.g., a face connecting between the front face and rear face of the electronic device 101). According to an example embodiment, the slidable housing 110 may constitute part of a region of the side face of the electronic device and the rear face thereof.

In an example embodiment, the slidable housing 110 may include a first housing 111 and a second housing 112 coupled movably in a specific range with respect to the first housing 111, so that the first and second housings are slidable relative to each other (e.g., the second housing 112 may slide or otherwise be moveable relative to the first housing 111).

In an example embodiment, the flexible display 120 may include the first portion 120a which is typically viewable by a user and can be coupled to the second housing 112, and a second portion 120b which can be inserted into the electronic device 101 by extending from the first portion 120a so as to be selectively viewable/nonviewable by a user.

In an example embodiment, the electronic device 101 may include a first state 101a and a second state 101b. For example, the first state 101a and second state 101b of the electronic device 101 may be determined according to a relative position of the second housing 112 with respect to the sliceable housing 110, and the electronic device 101 may be configured to be changeable between the first state 101a and the second state 101b by a user's manipulation or mechanical operation.

In various embodiments, the first state 101a of the electronic device 101 may be a state before the slidable housing 110 is extended (e.g., see FIG. 1). The second state 101b of the electronic device 101 may mean a state in which the slidable housing 110 is extended (e.g., see FIG. 2).

In an example embodiment, when the electronic device 101 transitions from the first state 101a to the second state 101b according to the movement of the second housing 112, the second portion 120b of the flexible display 120 may be drawn out (or exposed for view so as to be viewable by a user) to the outside from the inside of the electronic device 101. The drawing out (or exposing) of the flexible display 120 may mean that it is viewable from the outside of the electronic device 101. In an example embodiment, when the electronic device 101 transitions from the second state 101b to the first state 101a according to the movement of the second housing 112, the second portion 120b of the flexible display 120 may be inserted or drawn into the electronic device 101. In various embodiments, the inserting of the flexible display 120 may mean that the second portion 120b (or at least part thereof) is not viewable from the outside.

Figure 3:
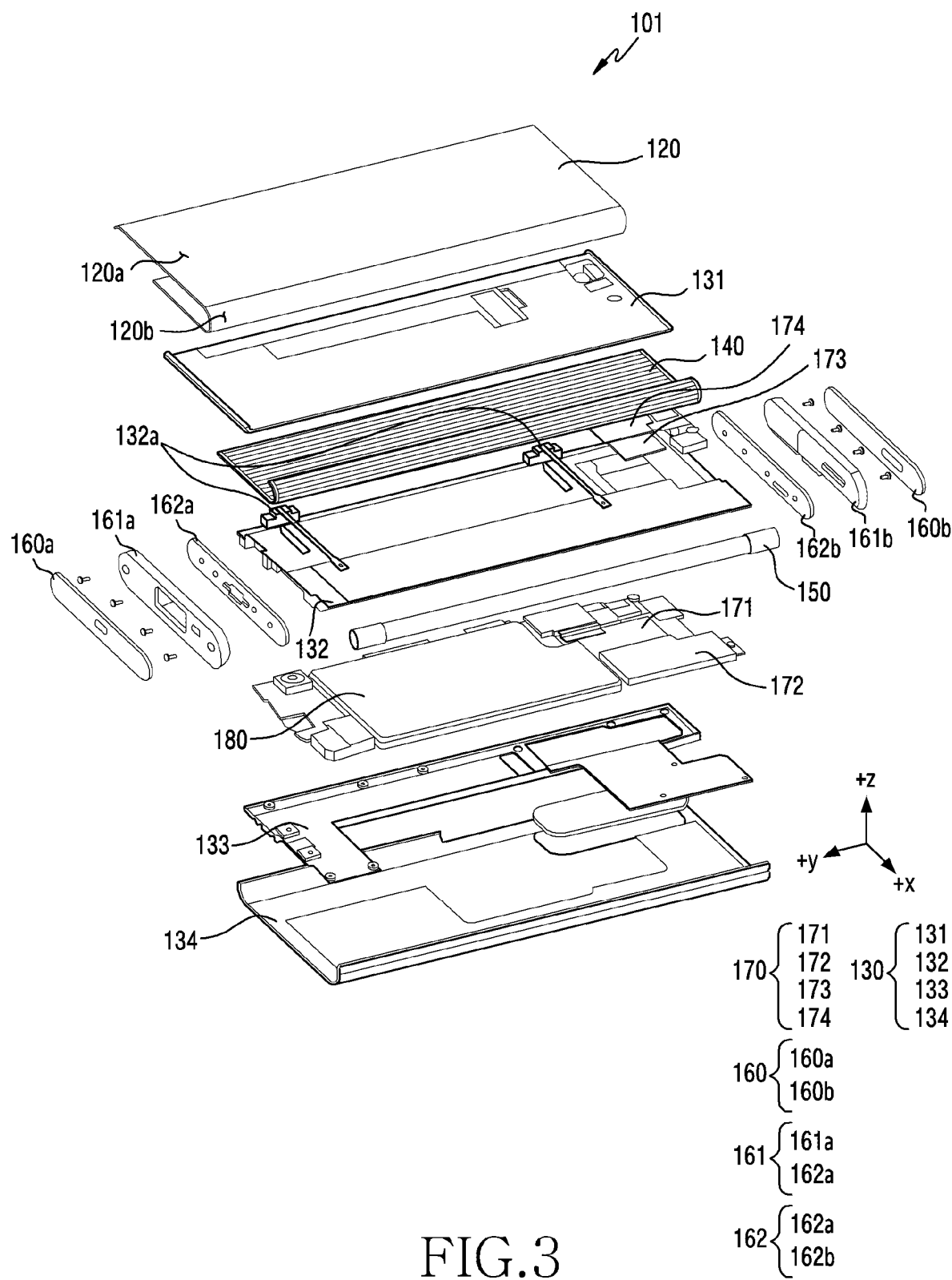
FIG. 3 is an exploded view of an electronic device, according to an embodiment.

FIG. 3 is an exploded view of an electronic device 101, according to an example embodiment.

At least one of components of the electronic device 101 may be identical or similar to at least one of components of the electronic device 101 of FIG. 1 and FIG. 2, and redundant descriptions will be omitted hereinafter.

Referring to FIG. 3, the electronic device 101 may include a flexible display 120, a sliding cover 131 (e.g., the second housing 112 of FIG. 1), a first mid plate 132, a second mid plate 133, a rear cover 134, a support structure (e.g., bars) 140, a driving unit 150, a side cover 160, a fixing member 161, a rail member 162, a Printed Circuit Board (PCB) 170, and/or a battery 180. In an embodiment, at least one of components of the electronic device 101 may be omitted, or other components may be additionally included. The at least one of the components of the electronic device 101 may be identical or similar to at least one of the components of the electronic device 101 of FIG. 1 or FIG. 2, and hereinafter, redundant descriptions will be omitted.

In an example embodiment, a slidable housing 110 may include a front cover (not shown) disposed to cover at least one region of the flexible display 120, the rear cover 134 constituting at least part of a rear face of the electronic device 101, the sliding cover 131 movably coupled between the front cover (not shown) and the rear cover 134 through a sliding motion, and the side cover 160 disposed to cover a side face in a direction substantially vertical to a movement direction of the sliding cover 131.

In an example embodiment, the rear cover 134 may further include a portion extending in a front direction of the electronic device 101, and the extended portion may constitute a side face of the electronic device 101. In an embodiment, the rear cover 134 may be coupled to a rear face of the second mid plate 133.

In an example embodiment, electronic parts may be disposed in an inner space of the slidable housing 110. For example, the battery 180 and the PCB 170 on which various electronic elements (e.g., a processor, a control circuit, a memory, and/or an interface) are disposed may be disposed in the space.

In an example embodiment, the sliding cover 131 may be disposed slidably on the first mid plate 132. For example, a sliding structure for supporting and guiding a connection between the sliding cover 131 and the first mid plate 132 and a movement of the sliding cover 131 may be provided between the sliding cover 131 and the first mid plate 132. In an embodiment, the sliding structure may include at least one elastic structure 132a. When the sliding cover 131 is moved by a set distance due to an external force, a state transition may occur from the reduced state of FIG. 1 to the extended state of FIG. 2, caused by the at least one elastic structure 132a. The at least one elastic structure 132a may be implemented using various elastic members such as a torsion spring. For example, as the at least one elastic structure 132a, the torsion spring may include one end coupled to the sliding cover 131, the other end coupled to the first mid plate 132, and a spring portion between the one end and the other end. When the sliding cover 131 is moved by the set distance in a first direction of slide-out, a position of the one end is changed with respect to the other end, so as to be moved in the first direction due to elasticity of the spring portion even if the external force is no longer present. Accordingly, the state transition may occur from the reduced state of FIG. 1 to the extended state of FIG. 2. When the sliding cover 131 is moved by the set distance in a second direction opposite to the first direction due to the external force, the position of the one end is changed with respect to the other end, so as to be moved in the second direction due to the elasticity of the spring portion even if the external force is no longer present. Accordingly, the state transition may occur from the extended state of FIG. 2 to the reduced state of FIG. 1.

In an example embodiment, the flexible display 120 may include a display panel layer and one or more plates (e.g., a metal plate 121 of FIG. 5 described below) mounted on the display panel layer. In an example, the flexible display 120 may include a first portion 120a exposed for view/visibility to the outside and a second portion 120b extending from the first portion 120a and inserted into the slidable housing 110 so as to not be viewable by a user or drawn out to the outside when the sliding cover 131 moves with respect to the first mode plate 132 so as to be viewable by a user. Thus, at least part of the second portion 120b is selectively viewable by a user due to different positioning.

In an example embodiment, the flexible display 120 may be coupled movably to the slidable housing 110. In an example, the flexible display 120 may be coupled on the sliding cover 131 and the first mid plate 132.

In an example embodiment, the support structure 140 may be attached to a rear face of the second portion 120b of the flexible display 120. The support structure 140 may be coupled such that a plurality of support structures can interwork with each other, and thus may be disposed to be bent along an outer circumferential face of the driving unit 150. In an example embodiment, the support structure 140 may guide the bending of the flexible display 120. In an example, it may be guided such that the second portion 120b of the flexible display 120 is rolled (or bent) via an outer face of the support structure 140. In an example, the support structure 140 may be moved by being coupled to at least the rail member 162.

In an example embodiment, the PCB 170 may be disposed between the first mid plate 132 and the second mid plate 133. In an example, the PCB 170 may include a first PCB 171, a second PCB 172, a third PCB 173, and a fourth PCB 174. In another example, the PCB 170 may include at least one of the first PCB 171, the second PCB 172 the third PCB 173, and the fourth PCB 174, or may include an additional fifth PCB. At least one of the first PCB 171, the second PCB 172, the third PCB 173, and the fourth PCB 174 may be implemented as a Flexible Printed Circuit Board (FPCB).

In an example embodiment, the side cover 160 may include a first side cover 160a and a second side cover 160b. The first side cover 160a may be coupled to an assembly 130 in a direction of the first fixing member 161a. The second side cover 160b may be coupled to the assembly 130 in a direction of the second fixing member 161b.

In an example embodiment, a first fixing member 161a including a first rail member 162a may be coupled to one side of the assembly 130 to which the sliding cover 131, the first mid plate 132, the second mid plate 133, and the rear cover 134 are coupled. A second fixing member 161b including a second rail member 162b may be coupled to the other side of the assembly 130 to which the sliding cover 131, the first mid plate 132, the second mid plate 133, and the rear cover 134 are coupled. In an example, the second fixing member 161b may be located at an opposite side of the first fixing member 161a. In an example, the rail member 162 including the first rail member 162a and the second rail member 162b may be disposed such that the sliding cover 131 induces a relative sliding motion with respect to the first mid plate 132.

In an example embodiment, at least part of the sliding cover 131, the first mid plate 132, the second mid plate 133, and the rear cover 134 may include a metal material or a non-metal material (e.g., polymer). In an example, at least part of the sliding cover 131, the first mid plate 132, the second mid plate 133, and the rear cover 134 may be implemented integrally. In an example, the assembly 130 may refer to a structure constituting at least part of the sliding cover 131, the first mid plate 132, the second mid plate 133, and/or the rear cover 134.

In an example embodiment, the driving unit 150 may include a cylinder-shaped roller extending in a direction (e.g., a −y axis direction) from the first side cover 160a to the second side cover 160b, and/or a motor.

According to an example embodiment, the battery 180 may be disposed inside the electronic device 101 to supply power to at least one component of the electronic device 101. For example, the battery 180 may include a non-rechargeable primary cell, a rechargeable secondary cell, or a fuel cell. According to an embodiment, the battery 180 may be disposed integrally inside the electronic device 101, but the disclosure is not limited thereto. The battery 180 according to an example embodiment may be detachably disposed with respect to the electronic device 101.

Figure 4A:
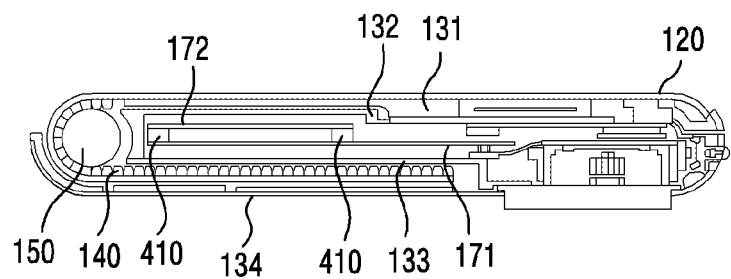
FIG. 4A is a cross-sectional view of the electronic device of FIG. 1, taken along the line A-A', according to an embodiment.
Figure 4B:
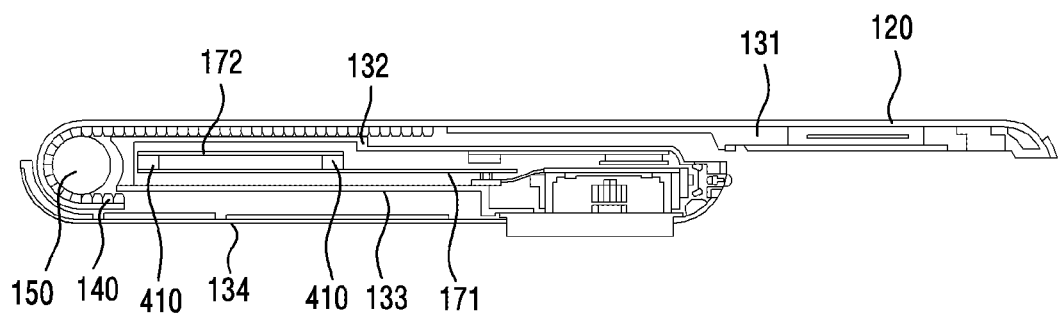
FIG. 4B is a cross-sectional view of the electronic device of FIG. 2, taken along the line A-A', according to an embodiment.

FIG. 4A is a cross-sectional view of the electronic device 101 of FIG. 1 or FIG. 3, taken along the line A-A' in FIG. 1, according to an embodiment. FIG. 4B is a cross-sectional view of the electronic device 101 of FIG. 2 or FIG. 3, taken along the line A-A' in FIG. 2, according to an example embodiment.

Referring to FIG. 4A and FIG. 4B, the electronic device 101 may include the flexible display 120, the sliding cover 131, the first mid plate 132, the second mid plate 133, the support structure 140, the driving unit 150, the first PCB 171, and the second PCB 172.

In an example embodiment, the PCB 170 may be disposed to at least one region of the electronic device 101. In an example, the first PCB 171 and the second PCB 172 may be disposed between the first mid plate 132 and the second mid plate 133. In an embodiment, a structure in which an interposer 410 and the second PCB 172 are sequentially stacked may be disposed between the first mid plate 132 and the second mid plate 133 with respect to the first PCB 171.

In an example embodiment, the first PCB 171 may be disposed to and/or proximate at least one region inside the electronic device 101. For example, the second PCB 172 may be disposed to face one face of the first PCB 171 facing a front face of the electronic device 101. In an example, the first PCB 171 and/or the second PCB 172 may be a PCB constructed of a material (e.g., FR4) having a non-bendable characteristic. In another example, the first PCB 171 and/or the second PCB 172 may be an FPCB having a bendable characteristic (or a flexible characteristic).

In an example embodiment, the interposer 410 may be located between the first PCB 171 and the second PCB 172, and may be coupled to the first PCB 171 and the second PCB 172. In an example, the first PCB 171 and the second PCB 172 may be electrically coupled through at least one conductive via of the interposer 410. In an example, the first PCB 171 may have a first size, and the second PCB 172 may have a second size smaller than the first size. In an example, the first PCB 171 may include a first region corresponding to the second PCB 172 and a second region excluding the first region. In an example, the interposer 410 may be disposed between the first region of the first PCB 171 and the second PCB 172. For example, the interposer 410 may be disposed to surround a space between the first region of the first PCB 171 and the second PCB 172.

In an example embodiment, a processor (e.g., a processor 510 of FIG. 5) including processing circuitry, a memory (e.g., a memory 2830 of FIG. 28), a control circuit, and/or an interface (e.g., an interface 2877 of FIG. 28) may be disposed on or at the first PCB 171 and/or the second PCB 172. For example, a Radio Frequency Integrated Circuit (RFIC) may be disposed on or at the second PCB 172. In an example, a plurality of electronic parts disposed on or at the first PCB 171 and a plurality of electronic parts disposed on or at the second PCB 172 may be electrically and/or operatively coupled through the interposer 410. In an example, the plurality of electronic parts disposed on or at the first PCB 171 and the plurality of electronic parts disposed on or at the second PCB 172 may be electrically coupled through a separate connection structure.

Referring to FIG. 4A and FIG. 4B, the flexible display 120 may be coupled to the first mid plate 132, a flat portion corresponding to a front face of the sliding cover 131, and a curved portion corresponding to a side face of the sliding cover 131. The curved face may be constructed by the support structure (e.g., bars) 140 coupled to the sliding cover 131. In an example, the support structure 140 may have a multi-bar shape, but the disclosure is not limited thereto. For example, the support structure 140 may have a lattice shape. The support structure 140 may be attached to a rear face of the flexible display 120 to guide bending of the flexible display 120.

In an example embodiment, the first mid plate 132 and the sliding cover 131 may support the flexible display 120. The sliding cover 131 may perform a sliding motion on the first mid plate 132 in a lateral direction (e.g., a +x diction). Accordingly, the flexible display 120 coupled on the sliding cover 131 may also slide in the lateral direction, and thus a display region of the flexible display 120 exposed for view (visible to a user) to the outside may be extended or reduced.

In an example embodiment, the second mid plate 133 may be coupled to a rear face of the first mid plate 132 to support the sliding cover 131. In an example, the rear cover 134 may be coupled to a rear face of the second mid plate 133.

In an example embodiment, the driving unit 150 may be coupled to the support structure 140 to allow the sliding cover 131 to perform a sliding motion. In an example, the driving unit 150 may have a bar shape, and may perform a rotation motion. In another example, the driving unit 150 may not perform the rotation motion but guide the sliding motion of the support structure 140 which is in contact with an outer circumferential face of the driving unit 150 according to driving of an actuator (not shown) such as a motor. The support structure 140 which is in contact with the outer circumferential face of the driving unit 150 may move by being bent with respect to the driving unit 150.

Referring to FIG. 4A, when the driving unit 150 rotates in a first rotation direction or guides the support structure 140 which moves in the first rotation direction, the support structure 140 may be rolled in an inward direction of the electronic device 101 along the outer circumferential face of the driving unit 150. Accordingly, the display region of the flexible display 120 exposed for view to the outside may be reduced.

Referring to FIG. 4B, when the driving unit 150 rotates in a second rotation direction opposite to the first rotation direction, the support structure 140 may be unfolded in an outward direction of the electronic device 101 along the outer circumferential face of the driving unit 150. Accordingly, the display region of the flexible display 120 exposed to the outside may be extended.

Figure 5:
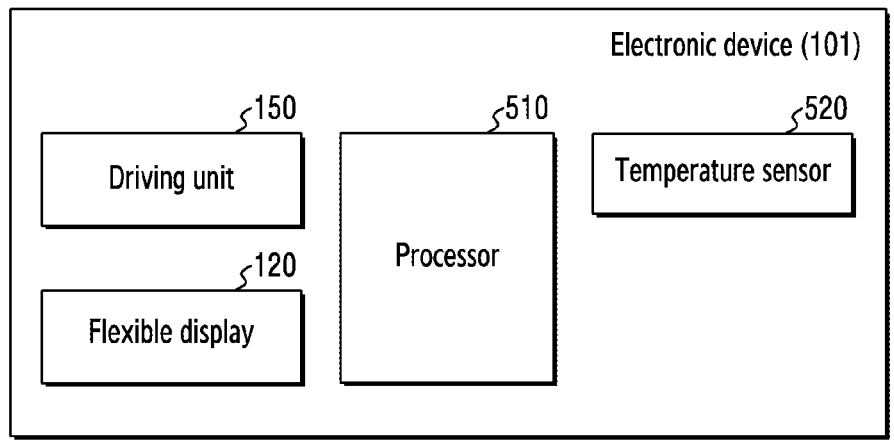
FIG. 5 is a block diagram illustrating components of an electronic device, according to an embodiment.

FIG. 5 is a block diagram illustrating components of the electronic device 101, according to an example embodiment.

In an embodiment, the electronic device 101 may include the flexible display 120, the driving unit 150, a processor 510, and/or a temperature sensor 520. The electronic device 101 may include an additional component (e.g., a memory (not shown)) other than the components of FIG. 5, or at least one of the components of FIG. 5 may be omitted.

In an embodiment, the processor 510 (e.g., a processor 2820 of FIG. 28) may be electrically or operatively coupled to the flexible display 120, the driving unit 150, and the temperature sensor 520. In an example, the processor 510 may use instructions stored in a memory (not shown in FIG. 5) to control at least one of other components of the electronic device 101 and/or execute an arithmetic operation or data processing for communication. In an example, the processor 510 may include at least one of a Central Processing Unit (CPU), a Graphic Processing Unit (GPU), a Micro Controller Unit (MCU), a sensor hub, a supplementary processor, a communication processor, an application processor, an Application Specific Integrated Circuit (ASIC), a Field Programmable Gate Arrays (FPGA), and may have a plurality of cores.

In an example embodiment, the flexible display 120 may visually output information to a user using at least one of Organic Light Emitting Diodes (OLED), Liquid Crystal Display (LCD), and Light Emitting Diodes (LED). The electronic device 101 may include a Touch Screen Panel (TSP) disposed above the flexible display 120, so that a user interface output through the flexible display 120 can be more intuitively controlled. The TSP may detect a position of an object (e.g., a user's finger or a stylus pen) which hovers above the flexible display 120 or touch the flexible display 102 using at least one of a resistive film, capacitive components, a surface acoustic wave, and an infrared ray.

In an embodiment, the flexible display 120 may include the first portion 120a exposed to the outside of the electronic device 101 and the second portion 120b extending from the first portion 120a and inserted into the electronic device 101 or drawn out to the outside (and thus be viewable by a user) when the second housing 112 moves with respect to the first housing 111.

In an embodiment, the flexible display 120 may control a region of the flexible display 120, which is determined to be exposed to the outside, in an active state. In addition, the flexible display 120 may control the remaining regions other than the region determined to be exposed to the outside, in an inactive state.

In an example embodiment, the flexible display 120 may include a plurality of layers. In an example, the flexible display 120 may include a display panel (not shown) including a plurality of pixels and optionally a metal plate 121 (e.g., see FIG. 11). In an example, the metal plate 121 may be disposed to a rear face of the display panel. The rear face of the display panel may be a face located opposite to a face on which light is emitted from the display panel.

In an example embodiment, the metal plate 121 may contribute to durability of the flexible display 120. For example, the metal plate 121 may allow the flexible display 120 to be less affected by a load or stress which may occur when transitioning between the first state 101a and the second state 101b. The metal plate 121 may reduce or prevent the flexible display 120 from being damaged due to a force delivered from the movement of the sliding cover 131.

In an example embodiment, the metal plate 121 may include various metal materials and/or non-metal materials (e.g., polymer). In an example, the metal plate 121 may include a stainless steel (STS). In another example, the metal plate 121 may include engineering plastic.

In an example embodiment, in the metal plate 121, at least part of a first portion (e.g., the first portion 120a of FIG. 2) of the flexible display 120 and a portion (e.g., the second portion 120b) disposed to be bent may include a lattice structure. The lattice structure may include a plurality of openings or a plurality of slits. The plurality of openings or the plurality of slits may contribute to flexibility of the flexible display 120. In an example, the lattice structure may be referred to as a 'pattern structure'. In an example, the metal plate 121 may include a recess pattern including a plurality of recesses, by replacing the lattice structure. The recess pattern may contribute to flexibility and rigidity of the flexible display 120.

In an example embodiment, the temperature sensor 520 (which may include sensing circuitry) may measure an ambient temperature of the flexible display 120. The processor 510 may measure the ambient temperature of the flexible display 120, detected through the temperature sensor 520. In an example, the temperature sensor 520 may include a temperature control IC. In an example, a memory (not shown) may store an instruction for allowing the processor 510 to detect the temperature of the flexible display 120. For example, the processor 510 may detect the temperature of at least part of the flexible display 120, or proximate at least part of the display 120, through the temperature sensor 520.

In an example embodiment, the electronic device 101 may include at least one temperature sensor 520. In an example, the at least one temperature sensor 520 may be disposed adjacent to the second portion 120b of the flexible display 120.

In an example, the temperature sensor 520 may include at least one of a thermistor, a resistance thermometer, a thermoelectric pair, a silicon transducer, and a Critical Temperature Resistor (CTR), as a component for converting the temperature into an electrical feature value. In an example, the temperature sensor 520 may include various other temperature sensing elements.

In an example embodiment, the memory (not shown) may store an instruction for controlling the processor 510 to drive the driving unit 150 physically and/or electrically coupled to the flexible display 120, based on the ambient temperature of the flexible display 120, and an instruction for controlling the ambient temperature of the flexible display 120. In an example, the driving unit 150 may have a bar shape, and may perform a rotation motion. In another example, the driving unit 150 may not perform the rotation motion but guide the sliding motion of the support structure 140 which is in contact with an outer circumferential face of the driving unit 150 according to driving of an actuator (not shown) such as a motor.

In an example embodiment, the electronic device 101 may include at least one heating part 530 in one region inside the electronic device. In an example, the heating part 530 may be mounted on a PCB (e.g., the PCB 170 of FIG. 3). The heating part 530 may include an SSD controller, a non-volatile memory device (e.g., a NAND flash memory), and/or a buffer memory device. In an example, the heating part 530 may include a Display Drive IC (DDI) which produces heat, and/or the processor 510.

In an example embodiment, the heating part 530 may include a resistance component. When power is provided to the heating part 530, part of power may be dissipated as thermal energy by the resistance component.

Figure 6A:
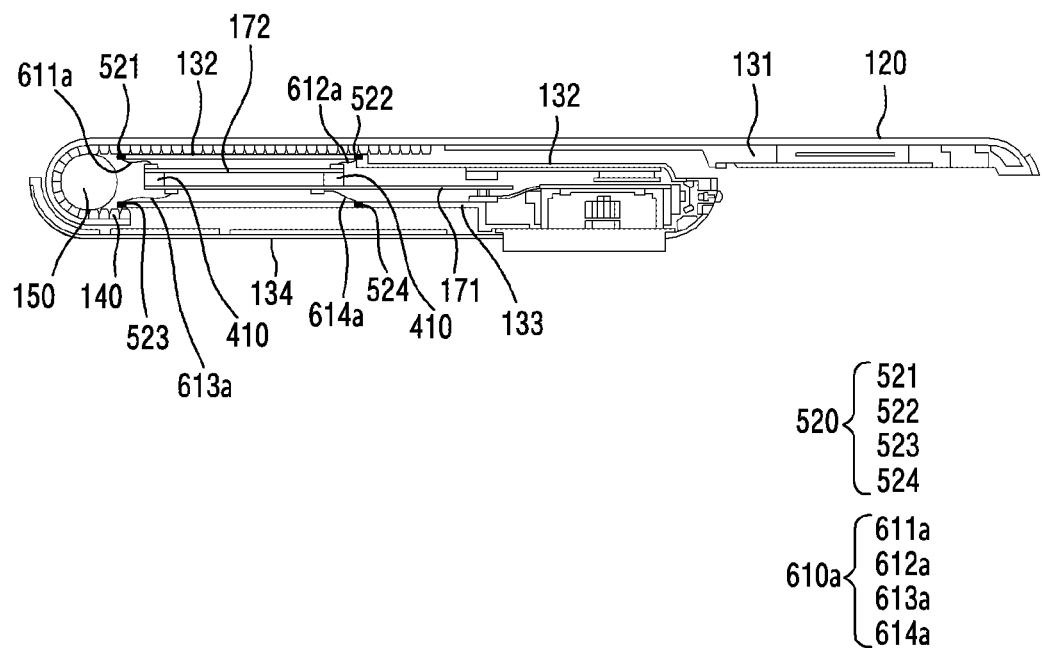
FIG. 6A illustrates an inside of an electronic device in a second state, including a temperature sensor, according to an embodiment.
Figure 6B:
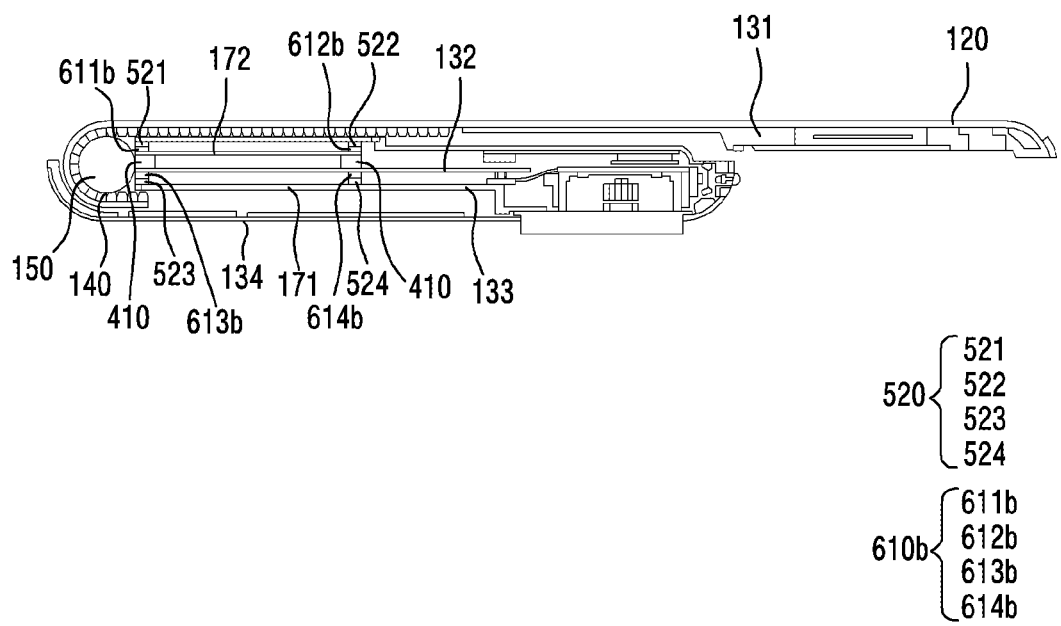
FIG. 6B illustrates an inside of an electronic device in a second state, including a temperature sensor, according to an embodiment.

FIG. 6A illustrates the inside of the electronic device 101 in the second state 101b, including the temperature sensor 520 (which may include sensing circuitry), according to an example embodiment. FIG. 6B illustrates the inside of the electronic device 101 in the second state 101b, including the temperature sensor 520, according to an example embodiment.

Referring to FIG. 6A and FIG. 6B, the electronic device 101 may include the temperature sensor 520 and a connection member 610.

In an embodiment, the electronic device 101 may include at least one temperature sensor 520. In an example, the at least one temperature sensor 520 may be disposed adjacent to the driving unit 150. The at least one temperature sensor 520 disposed adjacent to the driving unit 150 may obtain an ambient temperature of the flexible display 120 disposed adjacent to the driving unit 150.

In an embodiment, in the second state 101b of the electronic device 101, the first mid plate 132 may include a first face facing the support structure 140 and a second face located at an opposite side of the first face. Referring to FIG. 6A, a first temperature sensor 521 (which may include sensing circuitry) and/or a second temperature sensor 522 (which may include sensing circuitry) may be attached to the second face of the first mid plate 132. In an example, the first temperature sensor 521 may be attached to one end of the first mid plate 132 adjacent to the driving unit 150. The second temperature sensor 522 may be attached to the other end of the first mid plate 132. In an example, the first temperature sensor 521 may be electrically coupled to the second PCB 172 through the first connection member 611a. The second temperature sensor 522 may be electrically coupled to the second PCB 172 through the second connection member 612a.

In an example embodiment, in the second state 101b of the electronic device 101, the second mid plate 133 may include a first face facing the first PCB 171 and a second face located at an opposite side of the first face. Referring to FIG. 6A, a third temperature sensor 523 (which may include sensing circuitry) and/or a fourth temperature sensor 524 (which may include sensing circuitry) may be attached to the first face of the second mid plate 133. In an embodiment, the third temperature sensor 523 may be attached to one end of the second mid plate 133 adjacent to the driving unit 150. The fourth temperature sensor 524 may be attached to the other end of the second mid plate 133. In an example, the third temperature sensor 523 may be electrically coupled to the first PCB 171 through a third connection member 613a. The fourth temperature sensor 524 may be electrically coupled to the first PCB 171 through a fourth connection member 614a. In an example, without being limited to such a disposition, the temperature sensor 520 may further be disposed adjacent to the driving unit 150.

In an example embodiment, a first connection member 611a, a second connection member 612a, the third connection member 613a, and/or the fourth connection member 614a may be referred to as a connection member 610a. In an example, the connection member 610a may be a conductive connection member.

In an embodiment, the second PCB 172 may include a first face facing the first mid plate 132 and a second face located at an opposition side of the first face. Referring to FIG. 6B, the first temperature sensor 521 and/or the second temperature sensor 522 may be disposed to the first face of the second PCB 172. In an example, the first temperature sensor 521 may be disposed at or proximate one end of the second PCB 172. The second temperature sensor 522 may be disposed at or proximate the other end of the second PCB 172. In an example, the first temperature sensor 521 may be electrically coupled to the second PCB 172 through a first connection member 611b. The second temperature sensor 522 may be electrically coupled to the second PCB 172 through a second connection member 612b.

In an example embodiment, the first PCB 171 may include a first face facing the second mid plate 133 and a second face located at an opposition side of the first face. Referring to FIG. 4B, the third temperature sensor 523 and/or the fourth temperature sensor 524 may be disposed at or proximate the second face. In an example, the third temperature sensor 523 may be disposed at or proximate one end of the first PCB 171. The fourth temperature sensor 524 may be disposed at or proximate the other end of the first PCB 171. In an example, the third temperature sensor 523 may be electrically coupled to the first PCB 171 through a third connection member 613b. The fourth temperature sensor 524 may be electrically coupled to the first PCB 171 through a fourth connection member 614b.

In an example embodiment, the first connection member 611b, the second connection member 612b, the third connection member 613b, and/or the fourth connection member 614b may be referred to as a connection member 610b (e.g., see FIG. 6B). The connection member 610 may be a conductive connection member (e.g., a conductive tape).

In an example embodiment, the first temperature sensor 521, the second temperature sensor 522, the third temperature sensor 523, and/or the fourth temperature sensor 524 may be referred to as the temperature sensor 520.

In an example embodiment, the temperature sensor 520 may be electrically coupled to the first PCB 171 and/or the second PCB 172, so that temperature information of the flexible display 120, obtained through the temperature sensor 520, is transferred to the processor 510 mounted on the first PCB 171 or the second PCB 172. In an example, the temperature information of the flexible display 120 may include ambient temperature information of a region in which the temperature sensor 520 is disposed in the electronic device 101. For example, when the temperature sensor 520 is disposed adjacent to the driving unit 150 and/or adjacent to a region in which the support structure 140 is disposed, the processor 510 may obtain temperature information of a duration in which the flexible display 120 rolls along an outer circumferential face of the driving unit 150 through the temperature sensor 520. That is, the processor 510 may obtain temperature information of a region in which the second portion 122 of the flexible display 120 is disposed through the temperature sensor 520.

Figure 7:
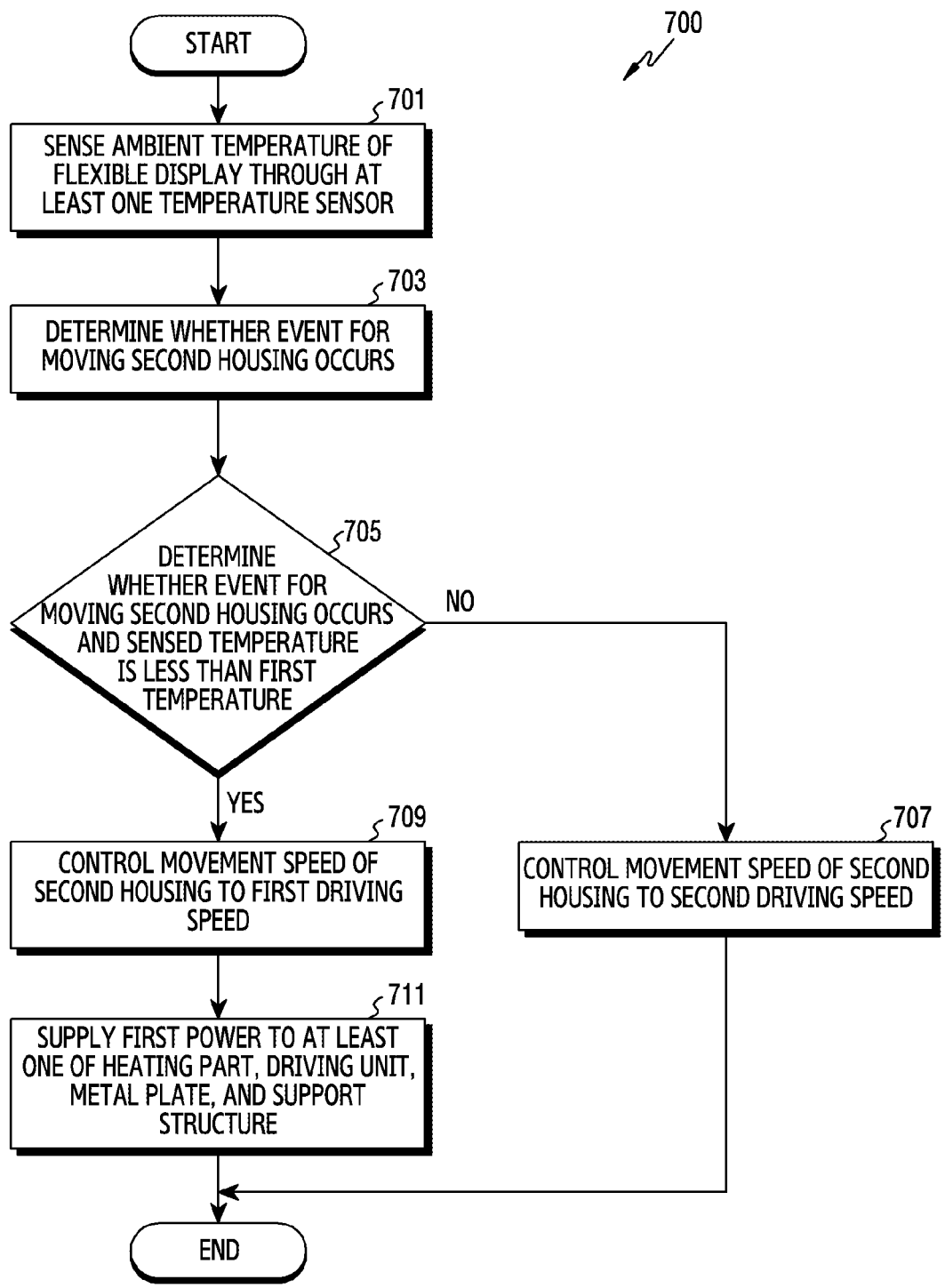
FIG. 7 is a flowchart illustrating a method of controlling a temperature of an electronic device, according to an embodiment.

FIG. 7 is a flowchart 700 illustrating a method of controlling a temperature of the electronic device 101, according to an example embodiment.

In the following embodiment, each of operations may be performed sequentially, but is not necessarily performed sequentially. For example, an order of each of operations may be changed, and at least two operations may be performed in parallel.

According to an example embodiment, in operation 701, the electronic device 101 (e.g., the processor 510 of FIG. 5) may sense an ambient temperature of and/or proximate the flexible display 120 through at least one temperature sensor 520. In an example, the processor 510 may obtain temperature information in a rolling region of the flexible display 120 through the at least one temperature sensor 520.

In an example embodiment, the electronic device 101 may include at least one temperature sensor 520 for detecting the ambient temperature of the flexible display 120. In an example, the at least one temperature sensor 520 may be disposed at least partially inside the second portion 120b of the flexible display 120. In an example, it may be disposed around a region in which the second portion 120b of the flexible display 120 moves according to the transition between the reduced state of FIG. 1 and the extended state of FIG. 2.

In an embodiment, the ambient temperature of the flexible display 120, obtained through the at least one temperature sensor 520, may vary depending on an external temperature condition of the electronic device 101.

In an embodiment, the processor 510 may obtain information on the ambient temperature of the flexible display 120 through the at least one temperature sensor 520.

According to an example embodiment, in operation 703, the electronic device 101 (e.g., the processor 510 of FIG. 5) may determine whether an event for moving the second housing 112 occurs. In an example, the processor 510 may sense a movement of the second housing 112 through a sliding sensor (not shown). For example, upon receiving a user input for moving the second housing 112, the processor 510 may transfer a control signal for moving the second housing 112 to the driving unit 150. In an example, the processor 510 may receive the user input for moving the second housing 112 through a Touch Sensor Panel (TSP) disposed above the flexible display 120. In another example, the processor 510 may receive the user input for moving the second housing 112 through a key input device (not shown) disposed to the electronic device 101.

In an embodiment, the processor 510 may determine whether the event for moving the second housing 112 occurs by various instructions stored in the memory (not shown). For example, upon receiving a user input for extending the electronic device 101 from the first state 101a to the second state 101b, the processor 510 may determine that the event for moving the second housing 112 occurs. In an example, the user input for extending the electronic device 101 from the first state 101a to the second state 101b may be obtained through the TSP disposed above the flexible display 120. In another example, the user input for extending the electronic device 101 from the first state 101a to the second state 101b may be received through a key input device (not shown) disposed to the electronic device 101.

According to an embodiment, in operation 705, the electronic device 101 (e.g., the processor 510 of FIG. 5) may determine whether the temperature sensed in operation 701 is less than a first temperature in response to the occurrence of the event for moving the second housing 112.

In an example embodiment, the processor 510 may determine whether the temperature sensed in operation 701 is less than the first temperature. In an example, a temperature below the first temperature (e.g., −5° C.) may correspond to a low temperature having a high possibility of damage to the flexible display 120. For example, if the ambient temperature of the flexible display 120 is less than the first temperature, the possibility of damage to the flexible display 120 may be high when the second housing 112 moves.

According to an example embodiment, if the event for moving the second housing 112 occurs and the sensed temperature is greater than or equal to the first temperature, in operation 707, the electronic device 101 (e.g., the processor 510 of FIG. 5) may control a movement speed of the second housing 112 to a first driving speed.

In an embodiment, if the sensed temperature is greater than or equal to the first temperature, the processor 510 may correspond to an appropriate temperature range of the flexible display 120 and thus the possibility of damage to the flexible display 120 may be low. In an example, if the sensed temperature is greater than or equal to the first temperature, the processor 510 may control a driving speed of the second housing 112 to a first driving speed, in response to the occurrence of the event for moving the second housing 112. In an example, the first driving speed may correspond to the driving speed of the second housing 112 within an appropriate temperature range of the flexible display 120.

According to an embodiment, if the event for moving the second housing 112 occurs and the sensed temperature is less than the first temperature, in operation 709, the electronic device 101 (e.g., the processor 510 of FIG. 5) may control the second housing 112 to a second driving speed.

In an example embodiment, if the sensed temperature is less than the first temperature, when the processor 510 controls the driving speed of the second housing 112 to the first driving speed in response to the occurrence of the event for moving the second housing 112, a stress is relatively more concentrated in the flexible display 120 than a case where the sensed temperature is greater than or equal to the first temperature, which may result in a high possibility of damage. In an example, if the sensed temperature is less than the first temperature, the processor 510 controls the driving speed of the second housing 112 to the second driving speed slower than the first driving speed, thereby decreasing a possibility of damage to the flexible display 120. In an example, the second driving speed may correspond to the driving speed of the second housing 112 when the ambient temperature of the flexible display 120 deviates from an appropriate temperature.

According to an example embodiment, if the event for moving the second housing 112 occurs and the sensed temperature is less than the first temperature, in operation 711, the electronic device 101 (e.g., the processor 510 of FIG. 5) may provide a first power to at least one of the heating part 530, the driving unit 150, the metal plate 121, and the support structure 140, for example to provide heating in order to raise a temperature of the flexible display.

In an example embodiment, if the sensed temperature is less than the first temperature, the processor 510 may provide control such that at least one component dissipates heat in order for the ambient temperature of the flexible display 120 to be within an appropriate temperature range (e.g., greater than or equal to the first temperature). In an example, the at least one component may include at least one of the heating part 530, the driving unit 150, the metal plate of the flexible display 120, and the support structure 140.

In an embodiment, the processor 510 may supply the first power so that at least one of the heating part 530, the driving unit 150, the metal plate 121, and the support structure 140 dissipates and/or produce heat.

In an example embodiment, when the processor 510 is performing or is scheduled to perform a function (e.g., signal transmission/reception through an antenna module, or communication through a wired/wireless communication circuit) through the heating part 530 disposed inside the electronic device 101, the processor 510 may restrict the supplying of the power to at least one of the driving unit 150, the metal plate 121, and the support structure 140. Since the processor 510 produces or is scheduled to produce heat by performing the function through the heating part 530, the power supplied to the driving unit 150, the metal plate 121, and the support structure 140 may be restricted to reduce or prevent the electronic device 101 from an excessive increase in temperature.

In an example embodiment, the operation in which the processor 510 supplies the power to at least one of the heating part 530, the driving unit 150, the metal plate 121, and the support structure 140 will be described below in greater detail with reference to FIG. 10A to FIG. 26.

Figure 8:
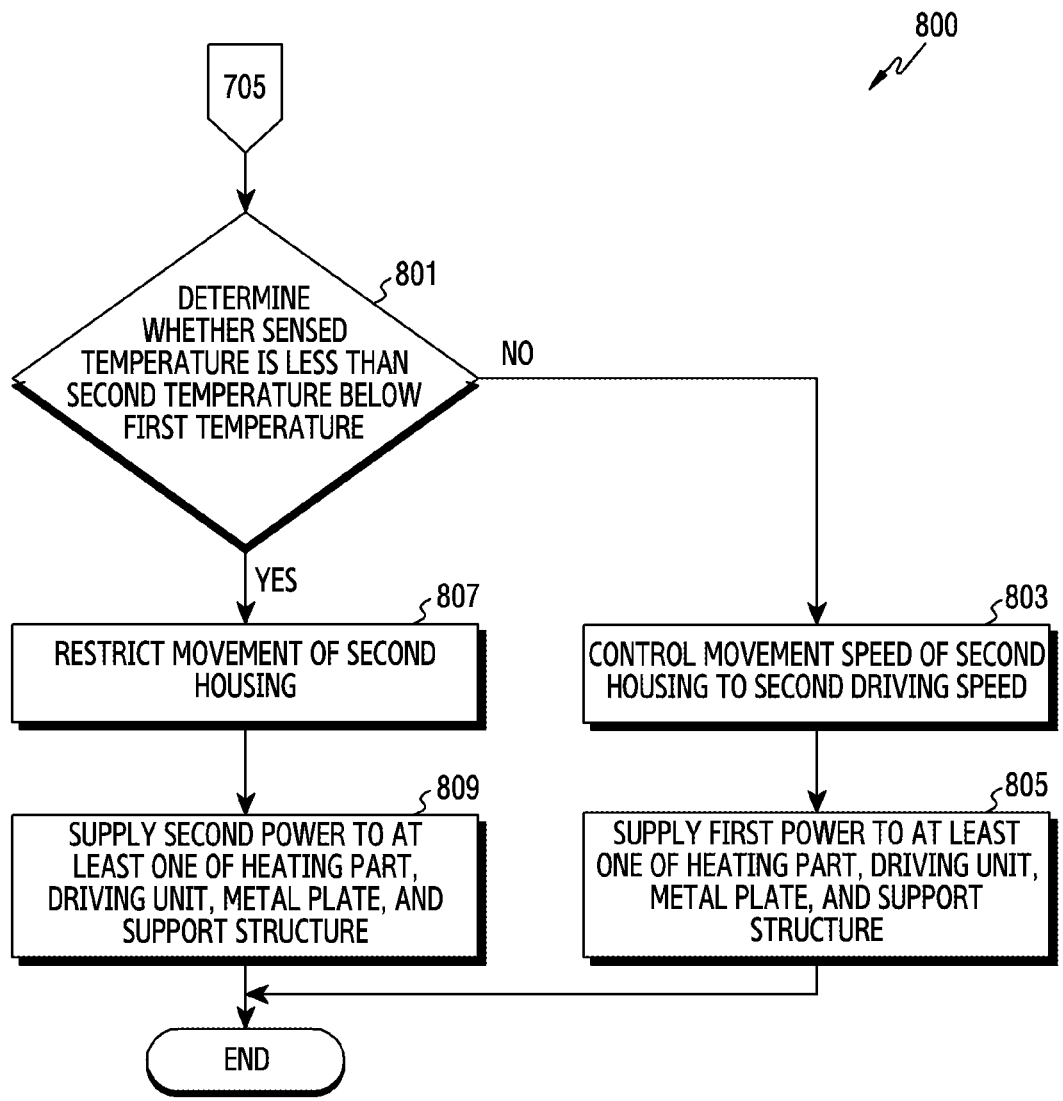
FIG. 8 is a flowchart illustrating a method of controlling a temperature of an electronic device, according to an embodiment.

FIG. 8 is a flowchart 800 illustrating a method of controlling a temperature of the electronic device 101, according to an example embodiment.

In the description of FIG. 8, descriptions duplicated or repeated with those described in FIG. 7 will be omitted.

According to an example embodiment, in operation 801, the electronic device 101 (e.g., the processor 510 of FIG. 5) may determine whether a sensed temperature is less than a second temperature below a first temperature.

In an example embodiment, the processor 510 may determine whether the sensed temperature is less than the second temperature below the first temperature through the operation 801 of FIG. 8. In an example, the first temperature (e.g., −5° C.) may be a reference temperature which is likely to damage the flexible display 120. In an example, the second temperature (e.g., −10° C.) may be a reference temperature which causes material deformation of the flexible display 120. In an example, the first temperature and the second temperature may be variously determined according to a material included in the flexible display 120.

According to an embodiment, if an event for moving the second housing 112 occurs and the sensed temperature is greater than or equal to the second temperature below the first temperature, in operation 803, the electronic device 101 (e.g., the processor 510 of FIG. 5) may control a movement speed of the second housing 112 to the second driving speed.

According to an embodiment, if the event for moving the second housing 112 occurs and the sensed temperature is greater than or equal to the second temperature below the first temperature, in operation 805, the electronic device 101 (e.g., the processor 510 of FIG. 5) may supply a first power to at least one of the heating part 530, the driving unit 150, the metal plate 121, and the support structure 140 such as for producing heat.

In an embodiment, the operation 803 may correspond to the operation 709 of FIG. 7. The operation 805 may correspond to the operation 711 of FIG. 7.

According to an embodiment, if the event for moving the second housing 112 occurs and the sensed temperature is less than the second temperature below the first temperature, in operation 807, the electronic device 101 (e.g., the processor 510 of FIG. 5) may restrict the movement of the second housing 112. That is, in an environment below the second temperature, the electronic device 101 may not move the housing until the temperature is restored to an appropriate temperature.

In an embodiment, if the sensed temperature is less than the second temperature below the first temperature, when the processor 510 controls the second housing 112 to move in response to the occurrence of the event for moving the second housing 112, a stress is relatively more concentrated in the flexible display 120 than a case where the sensed temperature is greater than or equal to the second temperature, which may result in a high possibility of damage. In an example, if the sensed temperature is less than the second temperature below the first temperature, the processor 510 may restrict the movement of the second housing 112 to reduce or prevent the damage of the flexible display 120 and/or the material deformation of the flexible display 120.

In an embodiment, if the processor 510 controls a driving speed of the second housing 112 to a second driving speed or restricts a movement of the second housing 112, a notification for this may be output. In an example, the processor 510 may output the notification through an audio module (e.g., an audio module 2870 of FIG. 28), the flexible display 120, and/or a haptic module (e.g., a haptic module 2879 of FIG. 28).

Figure 28:
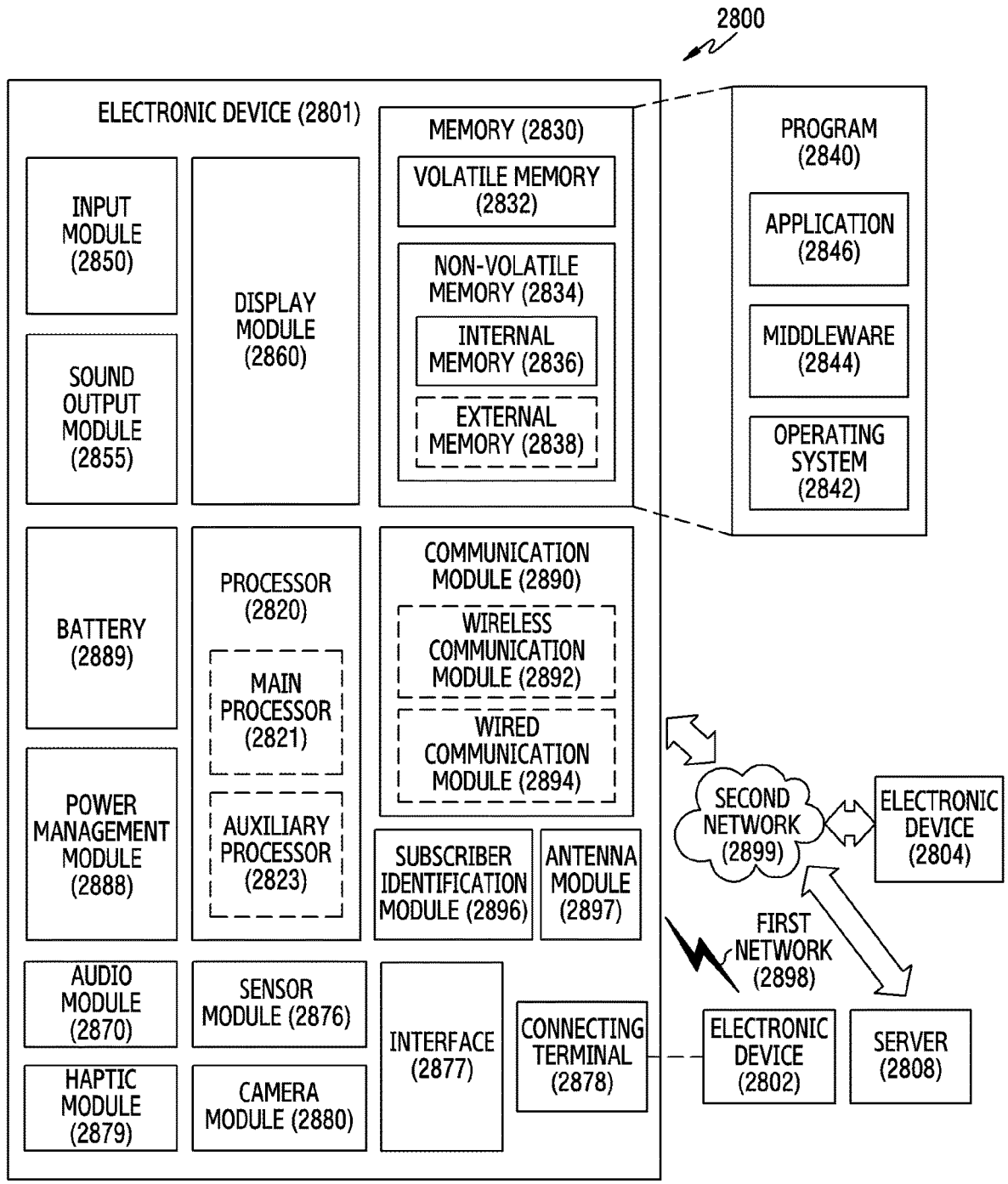
FIG. 28 illustrates a network environment including an electronic device, according to various embodiments.

In an embodiment, if the processor 510 controls the driving speed of the second housing 112 to the second driving speed or restricts the movement of the second housing 112, the processor 510 may output the notification for this through the audio module (e.g., the audio module 2870 of FIG. 28). For example, the processor 510 may output a voice message stating that 'the display is extending slowly due to the restriction of the display extension speed according to temperature adjustment of the device' through the audio module. In an example, if the processor 510 restricts the movement of the second housing 112, the processor 510 may output a voice message stating that 'the display extension is restricted according to the device temperature adjustment' through the audio module.

In an embodiment, if the processor 510 controls the driving speed of the second housing 112 to the second driving speed, the processor 510 may output a first vibration pattern through a haptic module. In an example, if the processor 510 restricts the movement of the second housing 112, the processor 510 may output a second vibration pattern different from the first vibration pattern through the haptic module.

In an embodiment, the processor 510 may output through the flexible display 120 a screen indicating that the movement speed of the second housing 112 is controlled to the second driving speed through the flexible display 120 or the movement of the second housing 112 is restricted.

In an embodiment, the operation in which the processor 510 outputs through the flexible display 120 the screen indicating that the movement speed of the second housing 112 is controlled to the second driving speed or the movement of the second housing 112 is restricted will be described in greater detail with reference to FIG. 9A and FIG. 9B.

According to an embodiment, if the event for moving the second housing 112 occurs and the sensed temperature is less than the second temperature below the first temperature, in operation 809, the electronic device 101 (e.g., the processor 510 of FIG. 5) may supply a second power to at least one of the heating part 530, the driving unit 150, the metal plate 121, and the support structure 140, such as to produce heat.

In an embodiment, if the sensed temperature is less than the second temperature below the first temperature, the processor 510 may provide control such that at least one component dissipates heat in order for the ambient temperature of the flexible display 120 to be within an appropriate temperature range (e.g., greater than or equal to the first temperature). In an example, the at least one component may include at least one of the heating part 530, the metal plate of the flexible display 120, the driving unit 150, and the support structure 140. In an example, the processor 150 may supply a second power to at least one of the heating part 530, the metal plate 121 of the flexible display 120, the driving unit 150, and the support structure 140. In an example, the second power may be higher than the first power. In an example, if the sensed temperature is less than the second temperature below the first temperature, it may be controlled such that more heat is dissipated through the at least one component by supplying higher power than a case where the sensed temperature is greater than or equal to the second temperature. In another example, even if the temperature is less than the second temperature, the first power may be equally supplied. That is, the operation 809 may be implemented in the same way as the operation 805.

In an embodiment, the method in which the processor 510 controls power to be supplied to at least one of the heating part 530, the metal plate 121 of the flexible display 120, and the support structure 140 will be described in greater detail with reference to FIG. 27A to FIG. 27C.

Figure 9A:
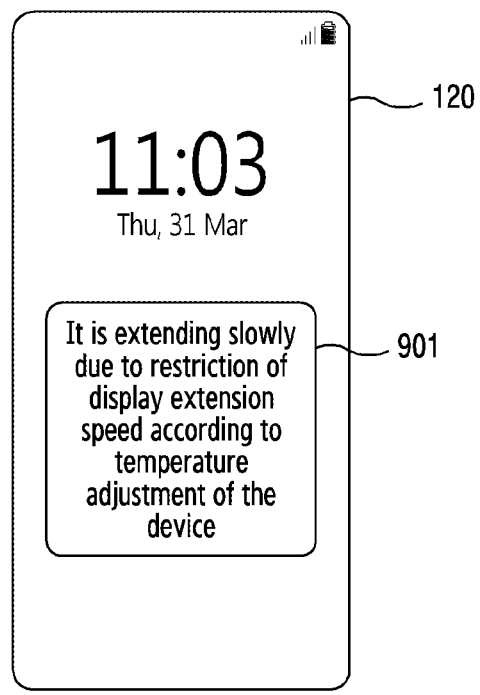
FIG. 9A illustrates a User Interface (UI) to be output on a screen of a flexible display, according to an embodiment.

FIG. 9A illustrates a User Interface (UI) to be output on a screen of the flexible display 120, according to an example embodiment. FIG. 9B illustrates a UI to be output on the flexible display 120, according to an example embodiment.

Referring to FIG. 9A, if an event for moving the second housing 112 occurs and an ambient temperature of the flexible display 120, sensed through the temperature sensor 520, is less than a first temperature, the processor 510 may control a movement speed of the second housing 112 to a second driving speed. In an example, the processor 510 may output a notification for this through the flexible display 120 in response to an operation of controlling the movement speed of the second housing 112 to the second driving speed. In an example, the processor 510 may output a notification message 901 stating that 'it is extending slowly due to the restriction of the display extension speed according to temperature adjustment of the device' through the flexible display 120. Accordingly, the electronic device 101 may provide user experience for recognizing a restriction on a driving speed of the second housing 112.

Figure 9B:
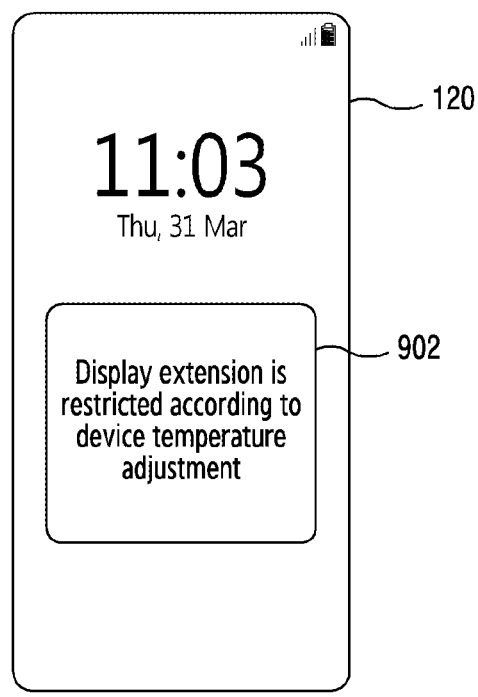
FIG. 9B illustrates a UI to be output on a flexible display, according to an embodiment.

Referring to FIG. 9B, if the event for moving the second housing 112 occurs and the ambient temperature of the flexible display 120, sensed through the temperature sensor 520, is less than a second temperature below the first temperature, the processor 510 may restrict a movement of the second housing 112. In an example, the processor 510 may output a notification for this through the flexible display 120 in response to an operation of restricting the movement of the second housing 112. In an example, the processor 510 may output a notification message 902 stating that 'the display extension is restricted according to the device temperature adjustment' through the flexible display 120.

Figure 10A:
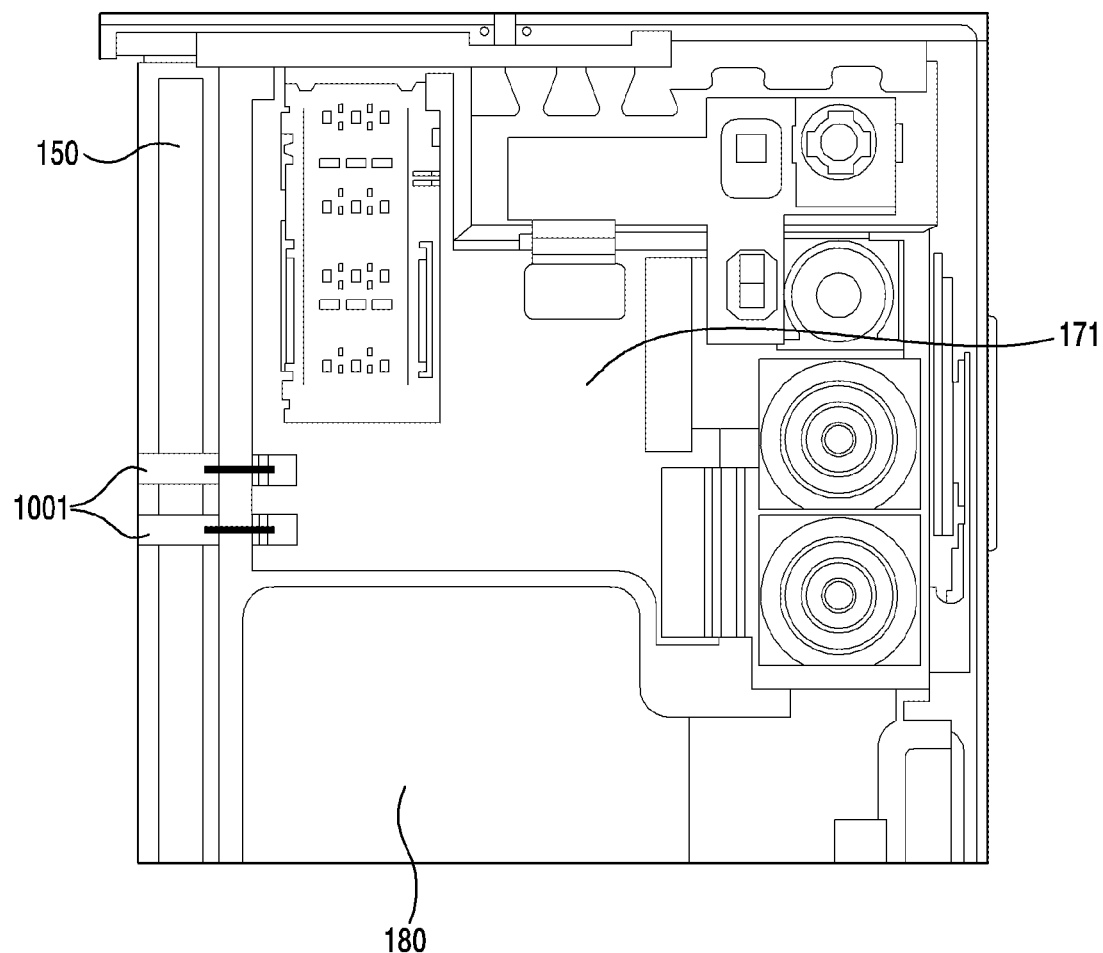
FIG. 10A illustrates an inside of an electronic device including a driving unit, according to an embodiment.
Figure 10B:
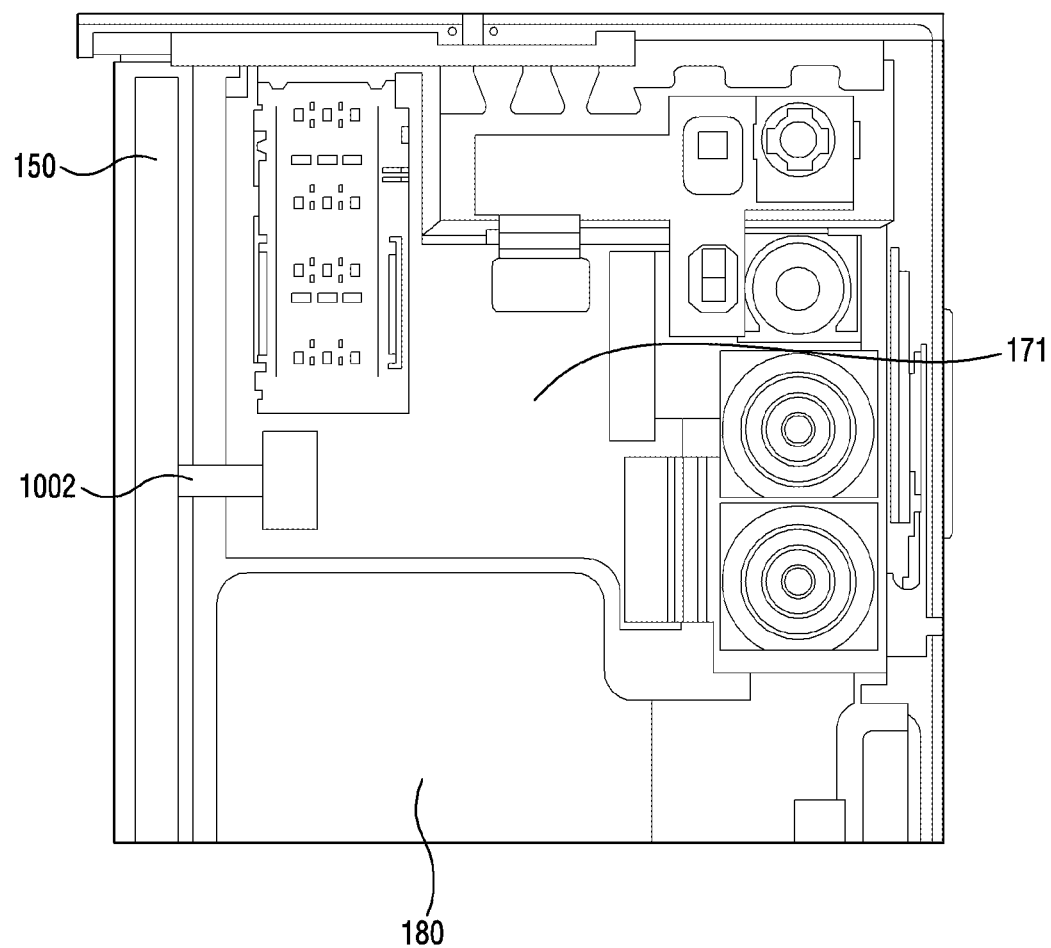
FIG. 10B illustrates an inside of an electronic device including a driving unit, according to an example embodiment.

FIG. 10A illustrates the inside of the electronic device 101 including the driving unit 150, according to an embodiment. FIG. 10B illustrates the inside of the electronic device 101 including the driving unit 150, according to an example embodiment.

Referring to FIG. 10A and FIG. 10B, the electronic device 101 may include the driving unit 150 and the first PCB 171. In an embodiment, the processor 510 may be disposed to the first PCB 171. Therefore, when the processor 510 supplies power to the driving unit 150, the processor 510 may supply power to the driving unit 150 through the first PCB 171. In an example, the driving unit 150 supplied with the power from the processor 510 may emit heat. In an example, the heat emitted from the driving unit 150 may be transferred to the flexible display 120 and thus may be diffused in the flexible display 120.

Referring to FIG. 10A, the processor 510 may supply power to the driving unit 150 through a first connection member 1001 (e.g., a c-clip or a pogo pin) coupled to the first PCB 171. In an example, the driving unit 150 and the first PCB 171 may be coupled to each other through the first connection member 1001.

Referring to FIG. 10B, the processor 510 may supply power to the driving unit 150 through a second connection member 1002 (e.g., an FPCB) coupled to the first PCB 171. In an example, the driving unit 150 and the first PCB 171 may be coupled to each other through the second connection member 1002.

In an example embodiment, the driving unit 150 supplied with the power may produce heat. In an example, the heat produced from the driving unit 150 may be transferred to the flexible display 120.

Figure 11:
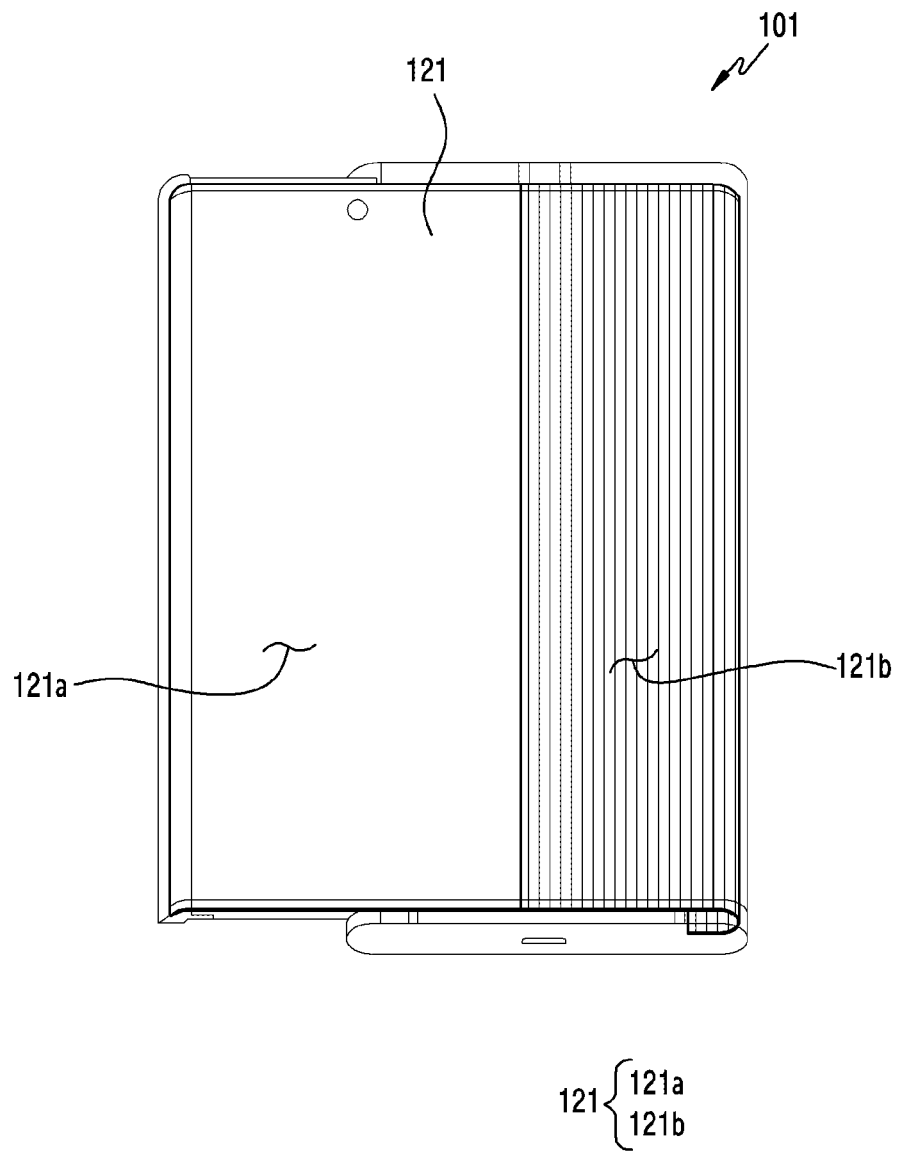
FIG. 11 is a perspective view of an electronic device including a metal plate, according to an embodiment.

FIG. 11 is a perspective view of the electronic device 101 including the metal plate 121, according to an embodiment.

Referring to FIG. 11, the electronic device 101 may include the metal plate 121. The flexible display 120 may include the metal plate 121.

In an embodiment, the metal plate 121 may provide durability of the flexible display 120. For example, the metal plate 121 may allow the flexible display 120 to be less affected by a load or stress which may occur when the electronic device 101 transitions between the first state 101*a* and second state 101*b*.

In an example embodiment, the metal plate 121 may include the first portion 121*a* of the metal plate 121 corresponding to the first portion 120*a* of the flexible display 120 and the second portion 121*b* of the metal plate 121 corresponding to a second portion (e.g., the second portion 120*b* of FIG. 2) of the flexible display 120. In another example, the second portion 121*b* of the metal plate 121 may correspond to at least part of the first portion 120*a* of the flexible display 120 and the second portion 120*b* thereof.

In an example embodiment, the second portion 121*b* of the metal plate 121 may include a lattice structure. The lattice structure may include a plurality of openings or a plurality of slits. The plurality of openings or the plurality of slits may contribute to flexibility of the flexible display 120.

Figure 12:
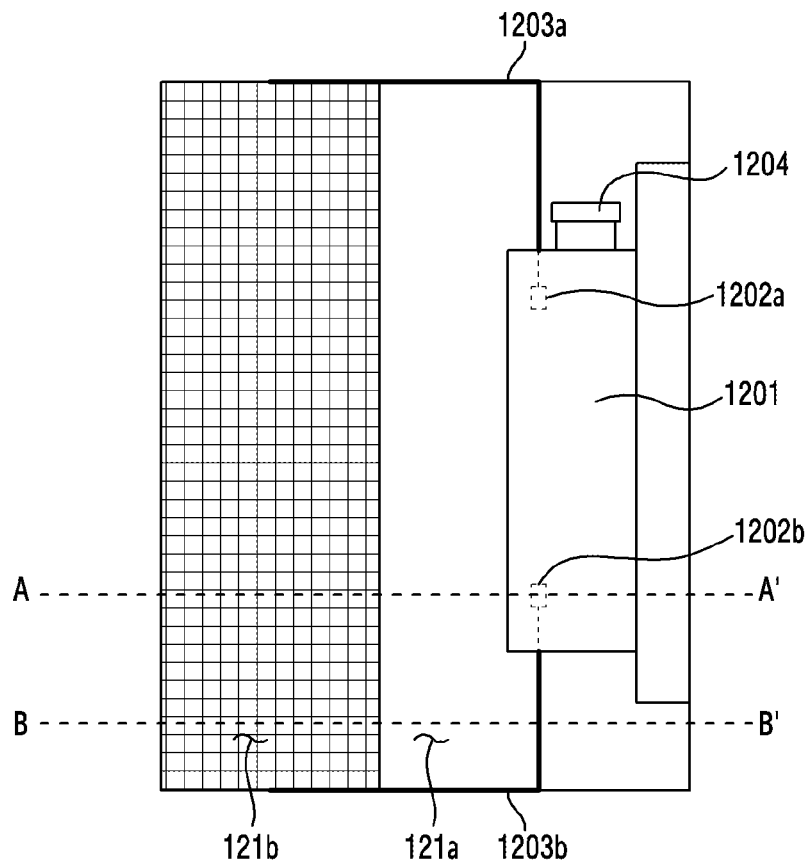
FIG. 12 illustrates an inside of an electronic device including a metal plate, according to an embodiment.

FIG. 12 illustrates the inside of the electronic device 101 including the metal plate 121, according to an example embodiment.

Referring to FIG. 12, the electronic device 101 may include the metal plate 121, a display FPCB 1201, a connection pad 1202, a conductive wire 1203, and an electrical connector 1204.

In an example embodiment, the display FPCB 1201, the connection pad 1202, and/or the electrical connector 1204 may be disposed to a region corresponding to the first portion 121*a* of the metal plate 121.

In an embodiment, the connection pad 1202 may be disposed to a first face where the display FPCB 1201 faces the metal plate 121. In an example, the connection pad 1202 may be electrically coupled to the display FPCB 1201. In an example, the connection pad 1202 may include a control circuit. In an example, the connection pad 1202 may include a Display Driver IC (DDI) and/or a Touch Display Driver IC (TDDI). In an example, the connection pad 1202 may include a first connection pad 1202*a* and/or a second connection pad 1202*b*. In an example, the first connection pad 1202*a* and the second connection pad 1202*b* may be constructed integrally.

In an example embodiment, the control circuit included in the first connection pad 1202*a* may supply power to the second portion 121*b* of the metal plate 121 through a first conductive wire 1203*a*. The control circuit included in the second connection pad 1202*b* may supply power to the second portion 121*b* of the metal plate 121.

In an example embodiment, the second portion 121*b* having the lattice structure of the metal plate 121 may include a heat cable and/or a heater electrode. In an example, the second portion 121*b* of the metal plate 121 supplied with the power from the control circuit disposed to the first connection pad 1202*a* and/or second connection pad 1202*b* may produce heat using the heat cable or the heater electrode.

In an example embodiment, the display FPCB 1201 may include a region in which a plurality of elements are disposed and the electrical connector 1204 disposed to an end portion of the display FPCB 1201 and electrically coupled to a first PCB (e.g., the first PCB 171 of FIG. 3) of the electronic device 101.

Figure 13A:
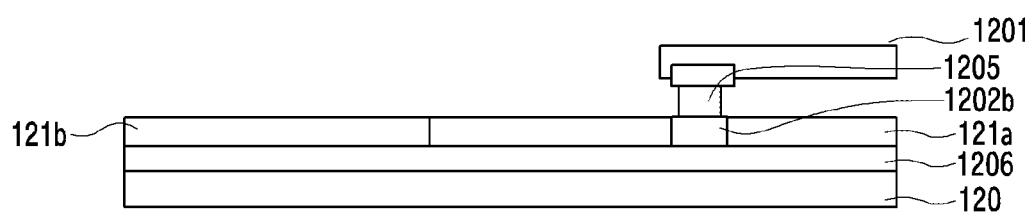
FIG. 13A is a cross-sectional view of the electronic device of FIG. 12, taken along the line A-A', according to an embodiment.
Figure 13B:
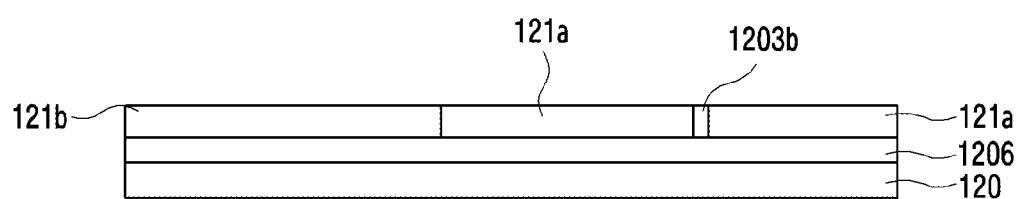
FIG. 13B is a cross-sectional view of the electronic device of FIG. 12, taken along the line B-B', according to an embodiment.

FIG. 13A is a cross-sectional view of the electronic device 101 of FIG. 12, taken along the line A-A', according to an example embodiment. FIG. 13B is a cross-sectional view of the electronic device 101 of FIG. 12, taken along the line B-B', according to an example embodiment.

Referring to FIG. 13A, the second connection pad 1202*b* may be disposed at or proximate a region corresponding to the first portion 121*a* of the metal plate 121. In another example, the second connection pad 1202*b* may be attached to a first face of the metal plate 121 facing the display FPCB 1201 through a connection member 1205.

In an example, the metal plate 121 may be attached to a display panel layer of the flexible display 120 through the connection member 1205 (e.g., a double-sided tape).

Referring to FIG. 13B, the second conductive wire 1203*b* may be constructed integrally with a region corresponding to the first portion 121*a* of the metal plate 121. In another example, the second conductive wire 1203*b* may be disposed on a region corresponding to the first portion 121*a* of the metal plate 121.

In an at or proximate embodiment, the processor 510 may supply power to the second portion 121*b* through the second conductive wire 1203*b* disposed on the same plane as the second portion 121*b* of the metal plate 121. In an example, the second portion 121*b* supplied with the power may produce heat. The heat produced from the second portion 121*b* may allow the flexible display 120 of a low temperature to maintain an appropriate temperature or to increase in temperature.

Figure 14:
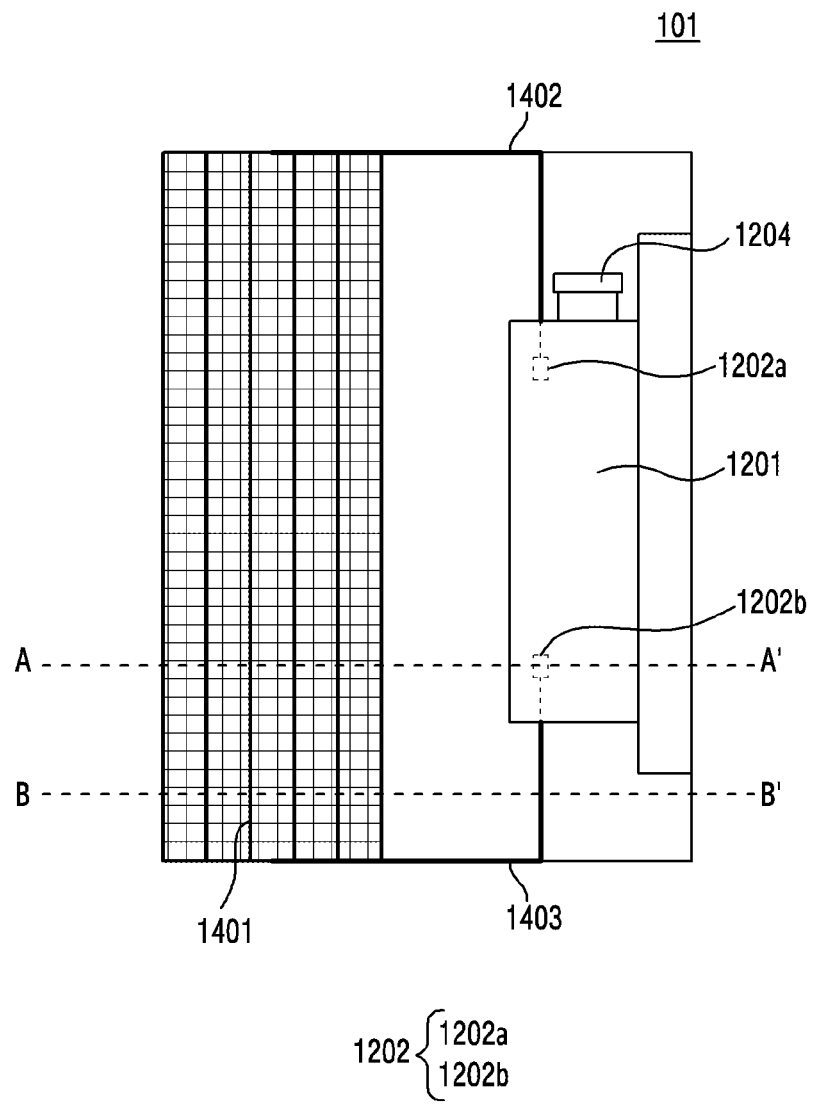
FIG. 14 illustrates an inside of an electronic device including a metal plate and a heating cable, according to an embodiment.

FIG. 14 illustrates the inside of the electronic device 101 including the metal plate 121 and a heating cable 1401, according to an example embodiment.

Referring to FIG. 14, the heating cable 1401 may be disposed at or proximate a portion corresponding to the second portion 121*b* having a lattice structure of the metal plate 121. In an example, the heating cable 1401 may include a heat line and/or a heater electrode. In an example, a face facing substantially the same direction as a direction facing the metal plate 121 may be defined as a front face of the metal plate 121, and a face opposite to the front face may be defined as a rear face of the metal plate 121. The heating cable 1401 may be disposed to a region corresponding to the second portion 121*b* of the front face and/or rear face of the metal plate 121.

In an embodiment, a control circuit included in the first connection pad 1202*a* may supply power to the heating cable 1401 through a first conductive wire 1401-1. A control circuit included in the second connection pad 1202*b* may supply power to the heating cable 1401 through a second conductive wire 1403. In an example, the heating cable 1401 supplied with the power form the control circuit disposed to the first connection pad 1202*a* and/or second connection pad 1202*b* may produce heat. The heat produced from the heating cable 1401 may be transferred to the flexible display 120.

Figure 15A:
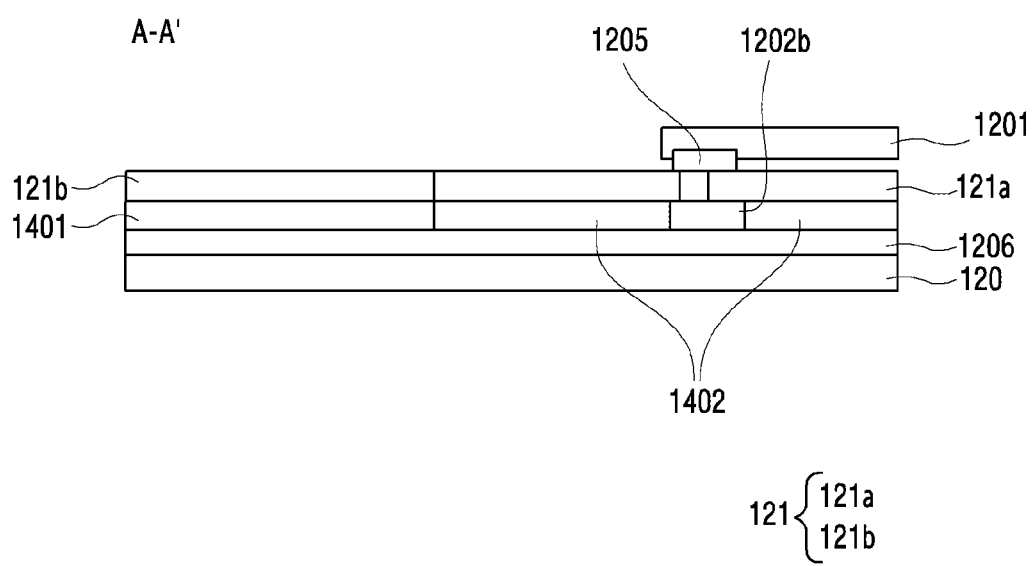
FIG. 15A is a cross-sectional view of the electronic device of FIG. 14, taken along the line A-A', according to an embodiment.
Figure 15B:
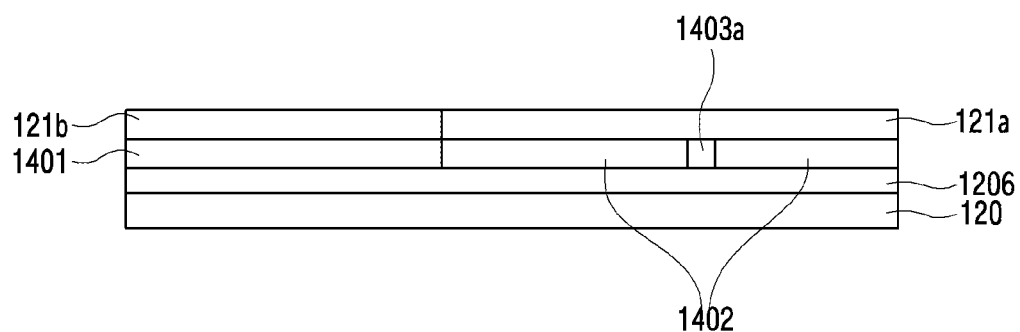
FIG. 15B is a cross-sectional view of the electronic device of FIG. 14, taken along the line B-B', according to an embodiment.

FIG. 15A is a cross-sectional view of the electronic device 101 of FIG. 14, taken along the line A-A', according to an embodiment. FIG. 15B is a cross-sectional view of the electronic device 101 of FIG. 14, taken along the line B-B', according to an embodiment.

Referring to FIG. 15A, in an example, the heating cable 1401 may be disposed to a region corresponding to the second portion 121b on the front face of the metal plate 121. In an example, a medium 1402 for compensating for a step difference may be disposed on a portion corresponding to the first portion 121a on the front face of the metal plate 121. In an example, the medium 1402 for compensating for the step difference may include tape, resin, or air.

In an embodiment, the second connection pad 1202b may be disposed to one region of a portion corresponding to the first portion 121a on the front face of the metal plate 121. In this case, the connection member 1205 may be disposed to one region of the first portion 121a so that the second connection pad 1202b and the display FPCB 1201 are electrically coupled.

Referring to FIG. 15B, in an example, a second conductive wire 1403a physically coupled to the second connection pad 1202b may be disposed to one region of a portion corresponding to the first portion 121a on the front face of the metal plate 121.

In an embodiment, if an ambient temperature of the flexible display 120 is a low temperature, the processor 510 may supply power to the heating cable 1401 through the second conductive wire 1403a disposed on a plane parallel to the heating cable 1401. In an example, the heating cable 1401 supplied with the power may produce heat. The heat produced from the heating wire 1401 may be transferred to the second portion 120b of the flexible display 120 so that the flexible display 120 maintains an appropriate temperature.

Figure 16A:
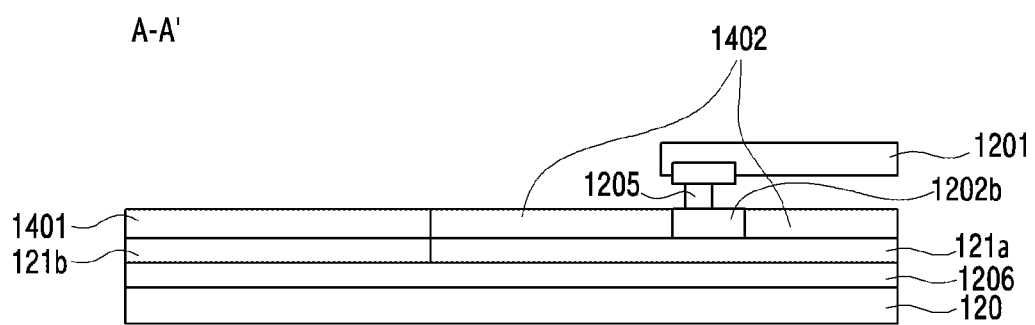
FIG. 16A illustrates the electronic device of FIG. 14, taken along the line A-A', according to an example embodiment.
Figure 16B:
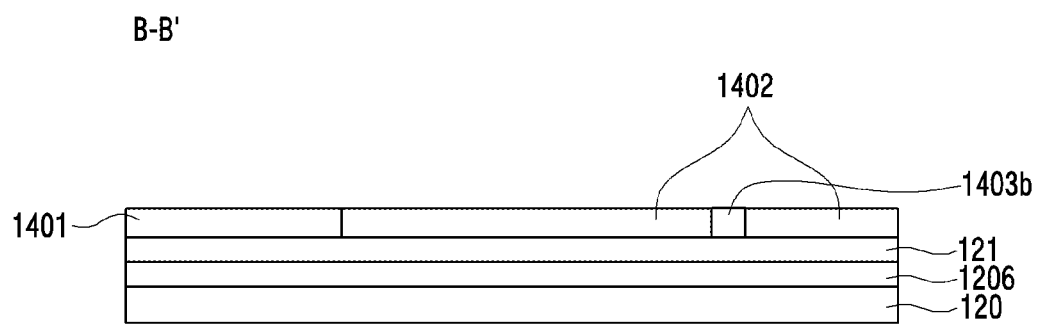
FIG. 16B illustrates the electronic device of FIG. 14, taken along the line B-B', according to an example embodiment.

FIG. 16A illustrates the electronic device 101 of FIG. 14, taken along the line A-A', according to an example embodiment. FIG. 16B illustrates the electronic device 101 of FIG. 14, taken along the line B-B', according to an example embodiment.

Referring to FIG. 16A, in an example, the heating cable 1401 may be disposed to a region corresponding to the second portion 121b on a rear face of the metal plate 121. In an example, the medium 1402 for compensating for a step difference may be disposed to a portion corresponding to the first portion 121a on the rear face of the metal plate 121.

Referring to FIG. 16B, in an example, the second conductive wire 1203b physically coupled to the second connection pad 1202b may be disposed to one region of the portion corresponding to the first portion 121a on the rear face of the metal plate 121.

Figure 17:
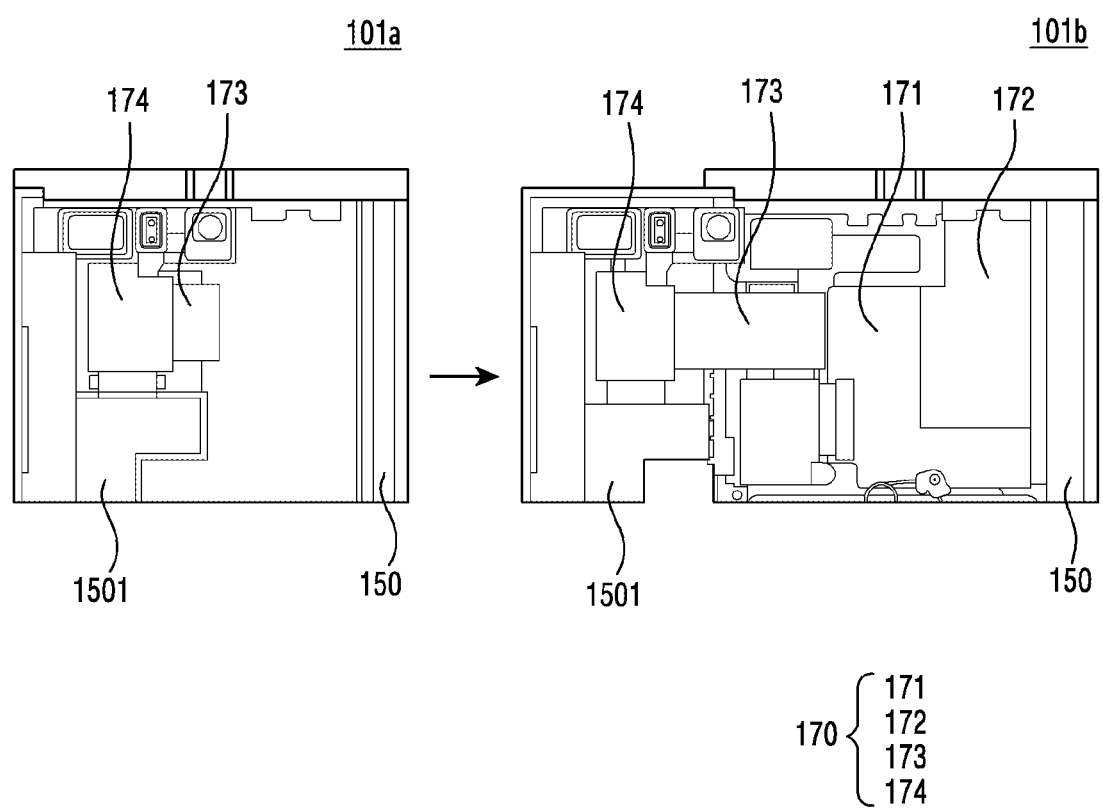
FIG. 17 illustrates an inside of an electronic device including a Printed Circuit Board (PCB), according to an embodiment.

FIG. 17 illustrates the inside of the electronic device 101 including the PCB 170, according to an example embodiment.

Referring to FIG. 17, the electronic device 101 may include the PCB 170 and the display FPCB 1501. In an example, the PCB 170 may include the first PCB 171, the second PCB 172, the third PCB 173, and the fourth PCB 174.

In an embodiment, the first PCB 171 may correspond to a main PCB, and a processor (e.g., the processor 510 of FIG. 5) may be disposed to the first PCB 171. The second PCB 172 may correspond to a sub PCB, and may transfer data obtained through a heating part disposed to the second PCB 172 to the processor 510 disposed to the first PCB 171.

In an example embodiment, the display FPCB 1501 may be coupled to the first PCB 171 through the third PCB 173 (e.g., a slide FPCB) and/or the fourth PCB 174.

In an embodiment, the processor 510 disposed to the first PCB 171 may transmit an electrical signal to a control circuit disposed to the display FPCB 1501 through the third PCB 173 and/or the fourth PCB 174. In an example, the control circuit disposed to the display FPCB 1501 may supply power to the second portion 121b of the metal plate 121 through a battery (e.g., the battery 180 of FIG. 3), based on the received electrical signal.

Hereinafter, example components for the support structure 140 supplied with the power to produce heat will be described with reference to FIG. 18 to FIG. 20.

Figure 18:
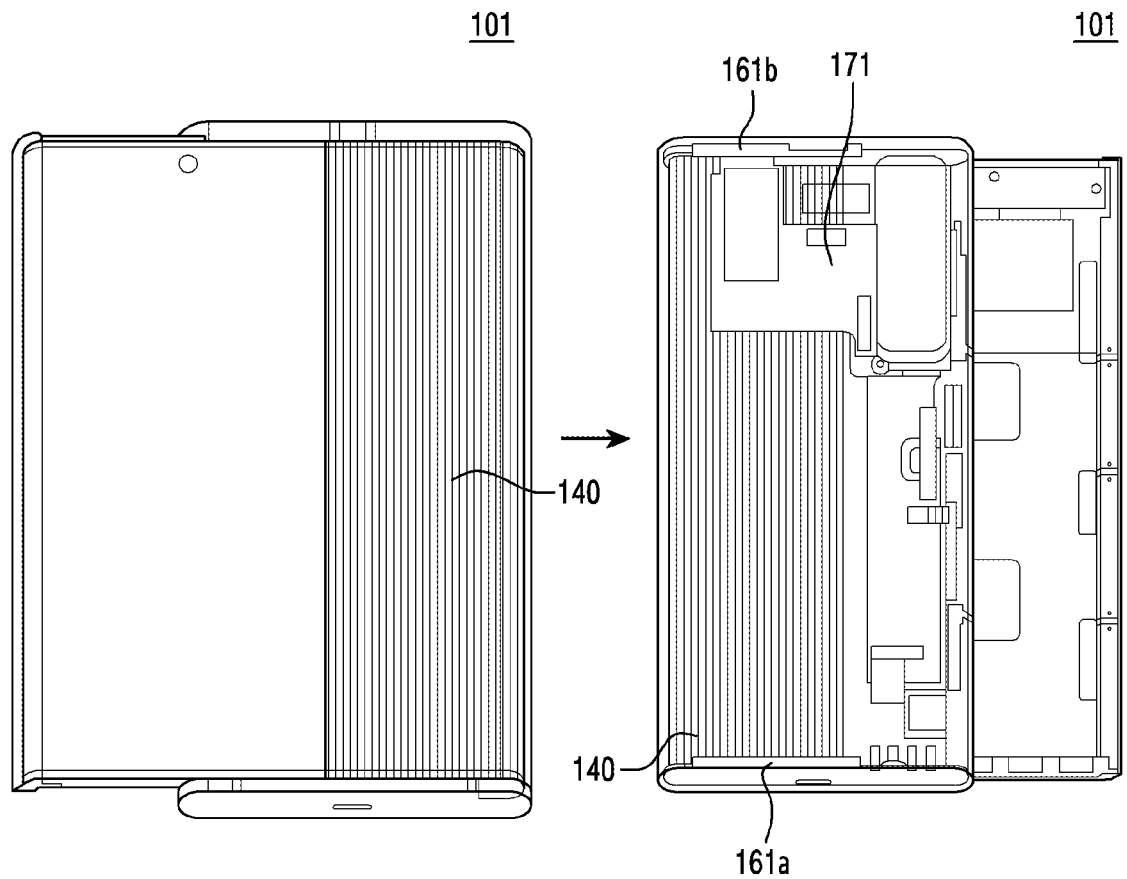
FIG. 18 illustrates a front face and rear face of an electronic device including a support structure, according to an embodiment.

FIG. 18 illustrates a front face and rear face of the electronic device 101 including the support structure 140, according to an example embodiment.

Referring to FIG. 18, the electronic device 101 may include the support structure 140. In an example, the support structure 140 may be attached to a rear face of the second portion 120b of the flexible display 120.

In an embodiment, when the electronic device 101 transitions between the first state 101a and the second state 101b, the support structure 140 may guide bending of the flexible display 120.

Figure 19:
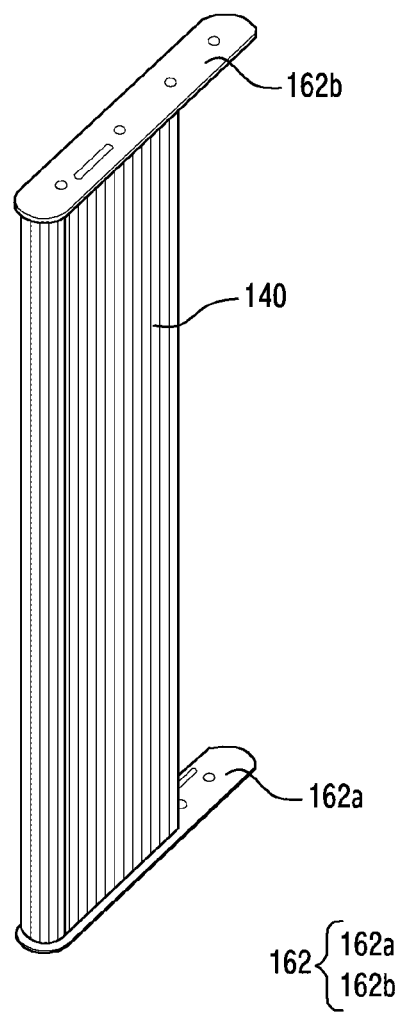
FIG. 19 illustrates a support structure and a rail member, according to an embodiment.

FIG. 19 illustrates the support structure 140 and the rail member 162, according to an example embodiment.

In an example embodiment, the rail member 162 may include the first rail member 162a and the second rail member 162b. In an example, the support structure 140 may guide bending of the flexible display 120 using the first rail member 162a and the second rail member 162b. In an example, the first rail member 162a and the second rail member 162b may include a recess so as to be coupled to the support structure 140. In an example, the first rail member 162a and/or the second rail member 162b may be coupled to the support structure 140 to support the support structure 140.

Figure 20:
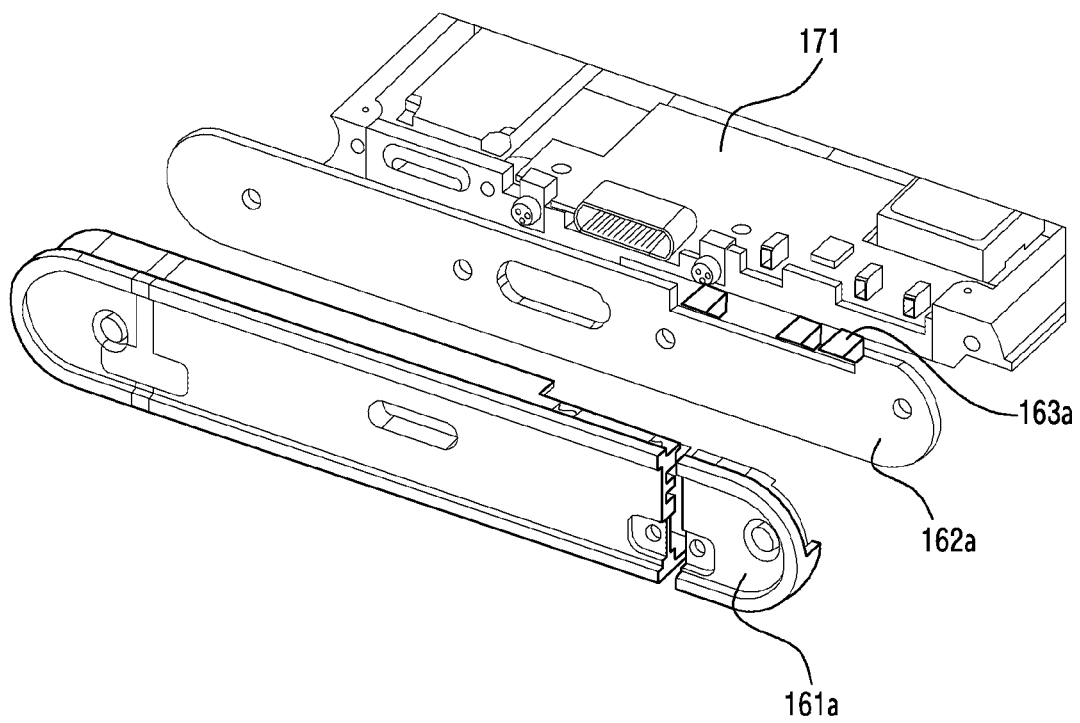
FIG. 20 illustrates a first fixing member and a first rail member, according to an embodiment.

FIG. 20 illustrates the first fixing member 161a and the first rail member 162a, according to an example embodiment.

Referring to FIG. 20, the first rail member 162a may include a flange 163a protruding towards the inside of the electronic device 101. The first rail member 162a may receive an electrical signal from the electronic device 101 (e.g., the processor 510 of FIG. 5) through the flange 163a. In an example, the description applied to the first rail member 162a may be equally applied to the second rail member 162b.

Figure 21:
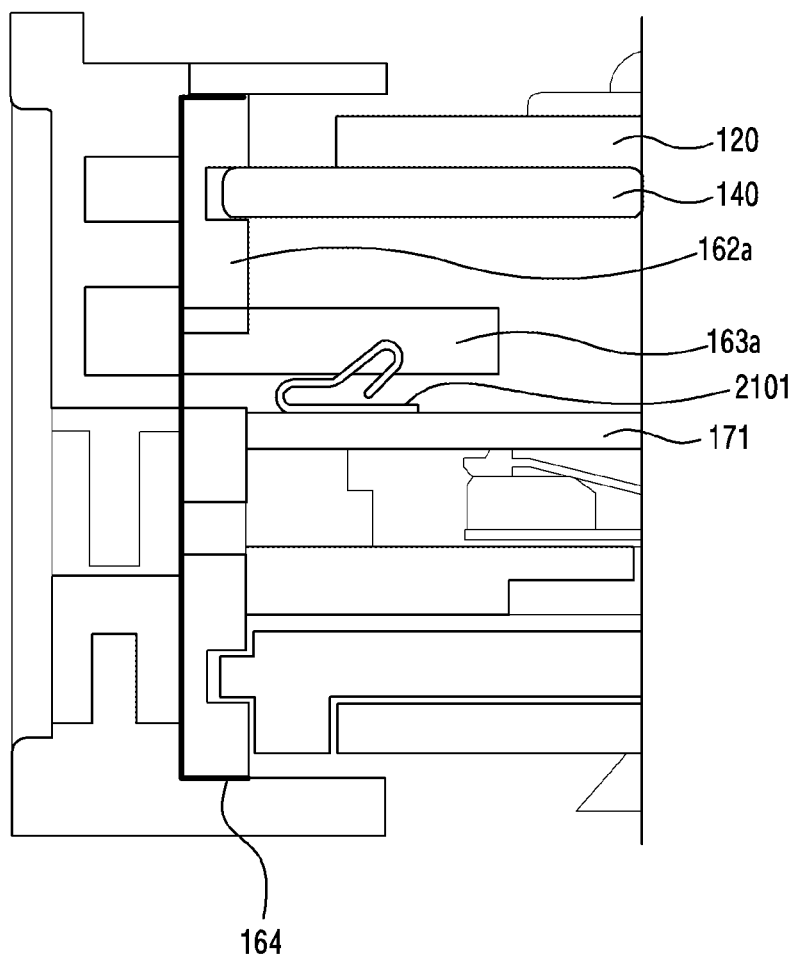
FIG. 21 illustrates a structure in which power is supplied to a support structure, according to an embodiment.

FIG. 21 illustrates a structure in which power is supplied to the support structure 140, according to an example embodiment.

Referring to FIG. 21, the support structure 140 may be coupled to the first rail member 162a to guide bending of the flexible display 120 through one region (e.g., a recess disposition region) of the first tail member 162a.

In an embodiment, the first PCB 171 may be coupled to the flange 163a included in the first rail member 162a through a connection member 2101. In an example, the connection member 2101 may include a c-clip. In an example, the connection member 2101 may include a protrusion. Since the protrusion of the connection member 2101 is inserted to at least one groove disposed to the flange 163a, the connection member 2101 may be in contact with the flange 163a.

In an embodiment, the processor 510 may supply power to the support structure 140 coupled to the first rail member 162a through the first PCB 171. In an example, the support structure 140 supplied with the power may produce heat.

In an embodiment, the first rail member 162a may include a shielding member 164 (e.g., an insulating tape) to protect various components disposed inside the electronic device 101. In an example, noise occurring while power is transferred to the support structure 140 through the first PCB 171 may be shielded through the shielding member 164. In addition, an electric shock which may occur through a conductive portion of the first rail member 162*a* may be reduce and/or prevented.

Figure 22:
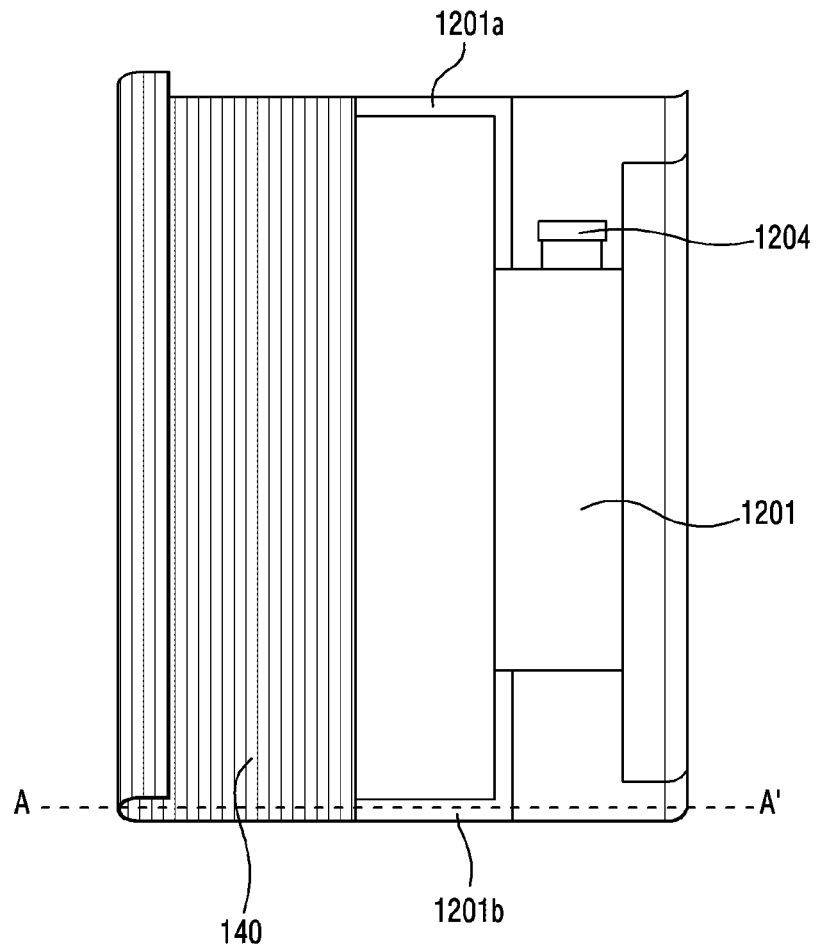
FIG. 22 illustrates a structure in which power is supplied to a support structure, according to an example embodiment.

FIG. 22 illustrates a structure in which power is supplied to the support structure 140, according to an example embodiment.

In an embodiment, the display FPCB 1201 may include a first extension portion 1201*a* which can be coupled to an upper end of the support structured 140 and a second extension portion 1201*b* which can be coupled to a lower end of the support structure 140.

In an embodiment, the processor 510 may supply power to the support structure 140 through the first extension portion 1201*a* and/or second extension portion 1201*b* coupled to the display FPCB 1201. In an example, the support structure 140 supplied with the power may produce heat.

Figure 23:
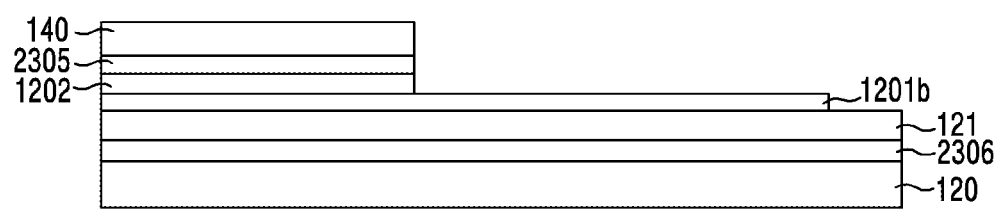
FIG. 23 is a cross-sectional view of the electronic device of FIG. 22, taken along the line A-A', according to an embodiment.

FIG. 23 is a cross-sectional view of the electronic device 101 of FIG. 22, taken along the line A-A', according to an example embodiment.

Referring to FIG. 23, a conductive connection member 2305, the connection pad 1202, the second extension portion 1201*b*, the metal plate 121, a connection member 2306, and the flexible display 120 may be disposed sequentially based on a rear face of the support structure 140.

In an embodiment, the connection pad 1202 may be attached to a rear face of the support structure 140 through the conductive connection member 2305 (e.g., a conductive tape). In an example, the connection pad 1202 may be electrically coupled to the second extension portion 1201*b* extending from the display FPCB 1201. In an example, the processor 510 may supply power to the support structure 140 through the display FPCB 1201, the second extension portion 1201*b* (and/or the first extension portion 1201*a*), and the connection pad 1202. In an example, the support structure 140 supplied with the power may produce heat.

Figure 24:
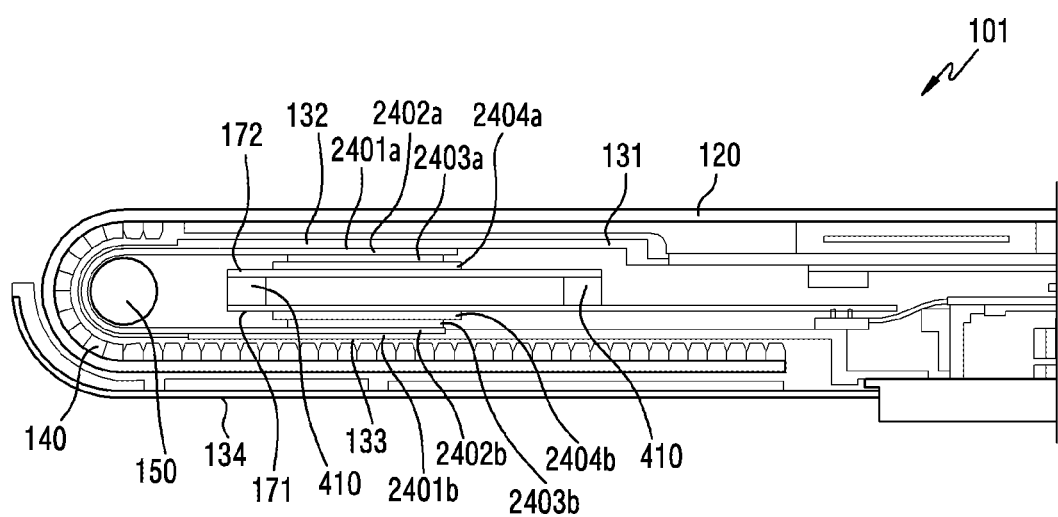
FIG. 24 illustrates an inside of an electronic device including an electronic component, according to an embodiment.

FIG. 24 illustrates the inside of the electronic device 101 including an electronic component, according to an example embodiment.

In an embodiment, the electronic device 101 may include the driving unit 150, the support structure 140, and/or components for diffusing heat emitted by the metal plate 121 included in the flexible display 120.

Referring to FIG. 24, the first PCB 171 and the second PCB 172 may include a first face facing the front face of the electronic device 101 and a second face opposite to the first face.

In an example embodiment, a heating part 2404*a* and a component (e.g., a TIM, a graphite sheet, and/or a vapor chamber) for diffusing heat may be disposed to the first face of the second PCB 172. In an example, the same component may be disposed such that components disposed to the second face of the first PCB 171 are symmetrical to components disposed to the first face of the second PCB 172.

In an example embodiment, the heating part 2404*a*, a third heat transfer member 2403*a*, a second heat transfer member 2402*a*, and/or a first heat transfer member 2401*a* may be disposed sequentially on the first face of the second PCB 172.

In an example, the first heat transfer member 2401*a*, the second heat transfer member 2402*a*, and the third heat transfer member 2403*a* may include a TIM, a graphite sheet, a heat pipe, and/or a vapor chamber.

In an example embodiment, a heating part 2404*b*, a third heat transfer member 2403*b*, a second heat transfer member 2402*b*, and/or a first heat transfer member 2401*b* may be disposed sequentially on the second face of the first PCB 171.

In an example embodiment, the heating part 2404*a* may include an electronic part disposed to the second PCB 172. The heating part 2404*b* may include an electronic part disposed to the first PCB 171. In an example, the heating part 2404*a* and the heating part 2404*b* may include the processor 510, a memory (e.g., the memory 2830 of FIG. 28), a control circuit antenna module (e.g., the antenna module 2897 of FIG. 28), and/or an interface (e.g., the interface 2877 of FIG. 28).

In an embodiment, heat produced from the heating parts 2404*a* and 2404*b*, the driving unit 150, the support structure 240, and/or the metal plate 121 may be transferred to the first mid plate 132 and the second mid plate 133 through the first heat transfer members 2401*a* and 2401*b*, the second heat transfer members 2402*a* and 2402*b*, and/or the third heat transfer members 2403*a* and 2403*b*. The heat transferred to the first mid plate 132 and the second mid plate 133 may be transferred to a region in which a rolling or sliding motion is achieved in the flexible display 120.

Figure 25:
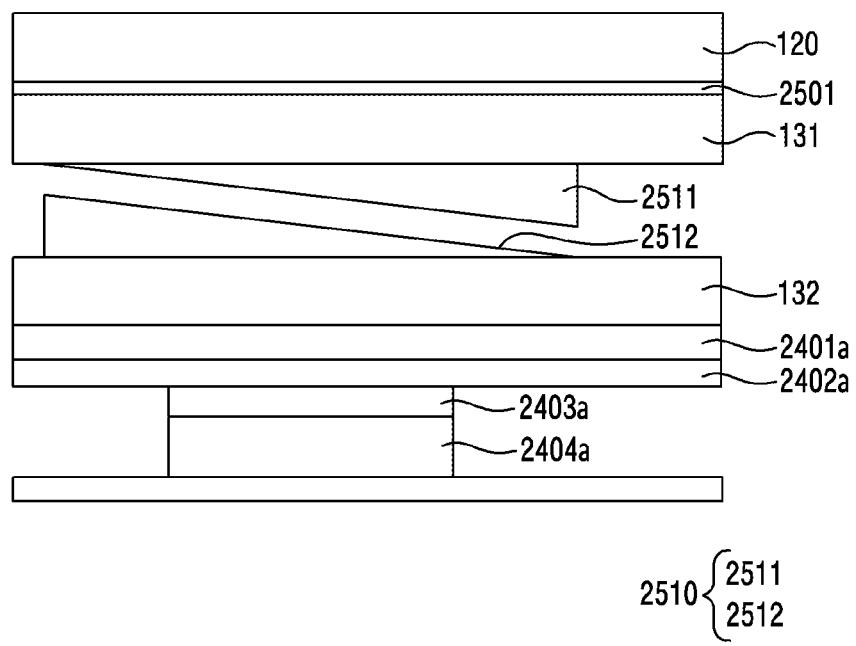
FIG. 25 illustrates some regions of an electronic device including a heat transfer structure, according to an embodiment.

FIG. 25 illustrates some regions of the electronic device 101 including a heat transfer structure 2510, according to an example embodiment.

Referring to FIG. 25, the heat transfer structure 2510 may be disposed between the sliding cover 131 and the first mid plate 132.

In an embodiment, the heat transfer structure 2510 may include a first heat transfer structure 2511 and a second heat transfer structure 2512. In an example, the first heat transfer structure 2511 may be disposed on a face facing the first mid plate 132 and the sliding cover 131. The second heat transfer structure 2512 may be disposed on a face facing the sliding cover 131 and the first mid plate 132.

In an embodiment, the heat transfer structure 2510 may include at least one of a Thermal Interface Material (TIM), a heat dissipation fiber, and graphite, or a combination thereof.

In an embodiment, the heat transfer structure 2510 may be disposed between the second mid plate 133 and the rear cover 134.

Figure 26A:
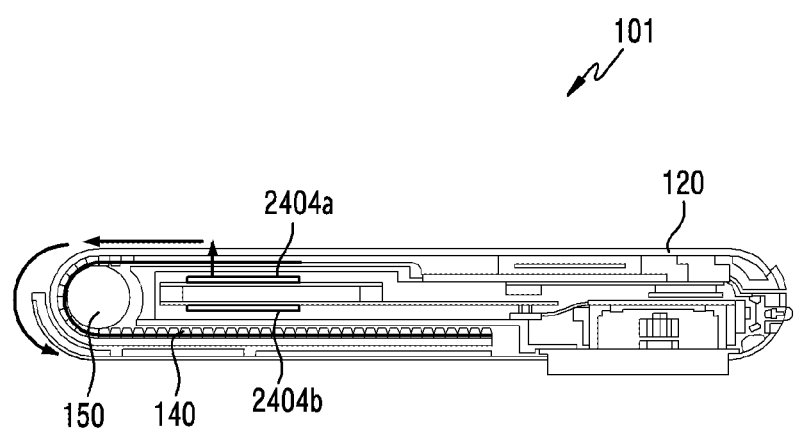
FIG. 26A illustrates a heating path of an electronic device which transitions to a first state, according to an embodiment.
Figure 26B:
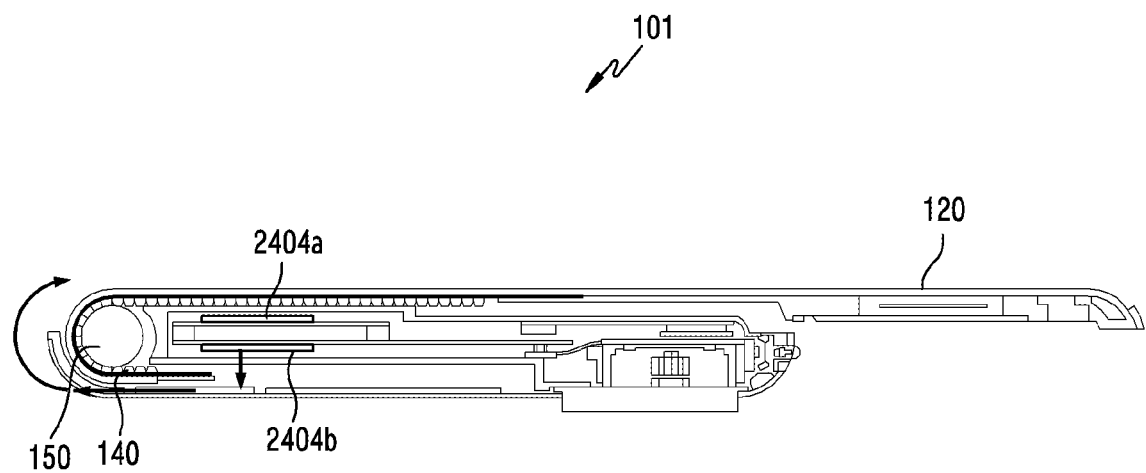
FIG. 26B illustrates a heating path of an electronic device which transitions to a second state, according to an embodiment.

FIG. 26A illustrates a heating path of the electronic device 101 which transitions to the first state 101*a*, according to an embodiment. FIG. 26B illustrates a heating path of the electronic device 101 which transitions to the second state 101*b*, according to an example embodiment.

Referring to FIG. 26A, when the second portion 120*b* of the flexible display 120 is inserted into the electronic device 101, the processor 510 may supply power to the heating part 2404*a*. In an example, the heating part 2404*a* supplied with the power produces heat, and transfers the heat to the flexible display 120, thereby reducing and/or preventing the flexible display 120 from being damaged due to a low temperature.

Referring to FIG. 26B, when the second portion 120*b* of the flexible display 120 is drawn out to the electronic device 101, the processor 510 may supply power to the heating part 2404*b*. The heating part 2404*a* supplied with the power produces heat, and transfers the heat to the flexible display 120, thereby reducing and/or preventing the flexible display 120 from being damaged due to a low temperature.

Figure 27A:
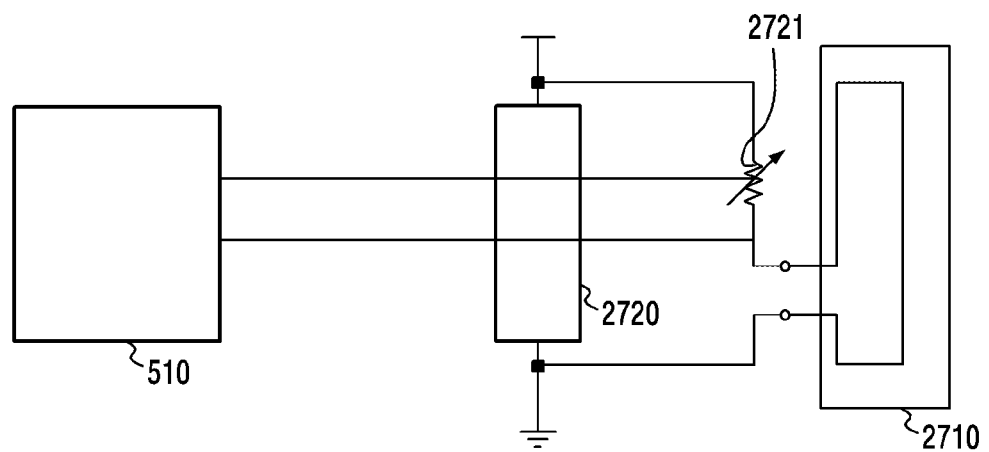
FIG. 27A illustrates a circuit for controlling a temperature of an electronic device, according to an embodiment.

FIG. 27A illustrates a circuit for controlling a temperature of the electronic device 101, according to an embodiment. FIG. 27B illustrates a circuit for controlling the temperature of the electronic device 101, according to an example embodiment. FIG. 27C illustrates a circuit for controlling the temperature of the electronic device 101, according to an example embodiment.

In an embodiment, the electronic device 101 may include the processor 510, a power circuit 2720, and a heating element 2710. In an example, the power circuit 2720 may receive a signal from the processor 510 and supply power to the heating element 2710.

In an example embodiment, the heating element 2710 may include the metal plate 121, the support structure 140, the driving unit 150, and/or the heating part 530.

In an example embodiment, the processor 510 may control a level of power supplied to the heating element 2710, based on an ambient temperature of the flexible display 120, which is obtained through the temperature sensor 520. For example, if a sensed temperature is less than a first temperature, the processor 510 may supply a first power to the heating element 2710. If the sensed temperature is less than a second temperature below the first temperature, the processor 510 may supply a second power higher than the first power to the heating element 2710.

Referring to FIG. 27A, the processor 510 may control a level of power supplied to the heating element 2710 by controlling a variable resistor 2721 of the power circuit 2720. In an example, the power circuit 2720 may determine a magnitude of the variable resistor 2721 in response to a signal received from the processor 510, thereby controlling the level of power supplied to the heating element 2710.

Figure 27B:
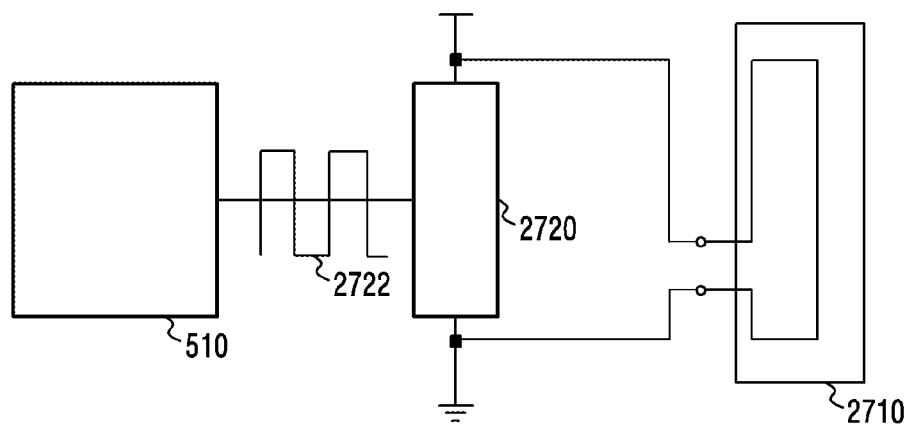
FIG. 27B illustrates a circuit for controlling a temperature of an electronic device, according to an example embodiment.

Referring to FIG. 27B, the processor 510 may control the level of power supplied to the heating element 2710 through a Pulse Width Modulation (PWM) control signal. In an example, the processor 510 may change a pulse width and thus control the level of power supplied to the heating element 2710 by the power circuit 2720.

Figure 27C:
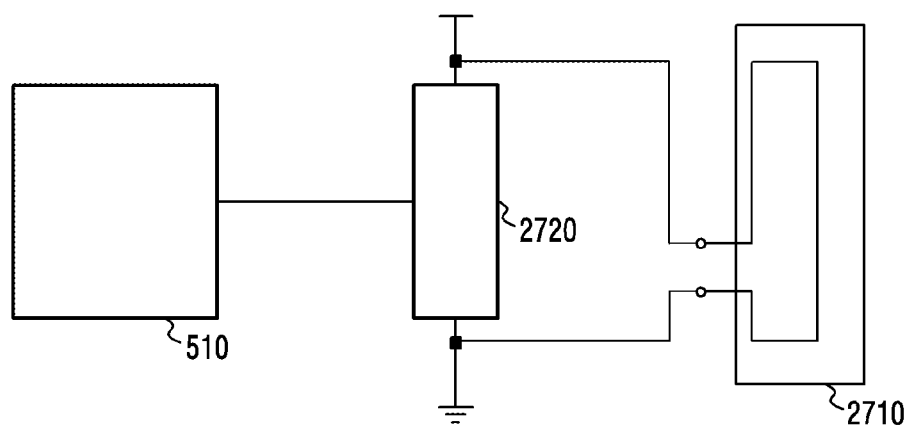
FIG. 27C illustrates a circuit for controlling a temperature of an electronic device, according to an example embodiment.

Referring to FIG. 27C, the power circuit 2720 may include a feedback control circuit (not shown). The power circuit 2720 may output power, based on a signal received from the processor 510. The power circuit 2720 may detect feedback voltage for the power and supply power to the heating element 2710, based on the feedback voltage.

FIG. 28 is a block diagram illustrating an electronic device 2801 in a network environment 2800 according to various example embodiments. Referring to FIG. 28, the electronic device 2801 in the network environment 2800 may communicate with an electronic device 2802 via a first network 2898 (e.g., a short-range wireless communication network), or at least one of an electronic device 2804 or a server 2808 via a second network 2899 (e.g., a long-range wireless communication network). According to an example embodiment, the electronic device 2801 may communicate with the electronic device 2804 via the server 2808. According to an embodiment, the electronic device 2801 may include a processor 2820, memory 2830, an input 28module 2850, a sound output 28module 2855, a display 28module 2860, an audio module 2870, a sensor module 2876, an interface 2877, a connecting terminal 2878, a haptic module 2879, a camera module 2880, a power management module 2888, a battery 2889, a communication module 2890, a subscriber identification module(SIM) 2896, or an antenna module 2897. In some embodiments, at least one of the components (e.g., the 2828connecting terminal 2878) may be omitted from the electronic device 2801, or one or more other components may be added in the electronic device 2801. In some embodiments, some of the components (e.g., the sensor module 2876, the camera module 2880, or the antenna module 2897) may be implemented as a single component (e.g., the display module 2860).

The processor 2820 may execute, for example, software (e.g., a program 2840) to control at least one other component (e.g., a hardware or software component) of the electronic device 2801 coupled with the processor 2820, and may perform various data processing or computation. According to one embodiment, as at least part of the data processing or computation, the processor 2820 may store a command or data received from another component (e.g., the sensor module 2876 or the communication module 2890) in volatile memory 2832, process the command or the data stored in the volatile memory 2832, and store resulting data in non-volatile memory 2834. According to an embodiment, the processor 2820 may include a main processor 2821 (e.g., a central processing unit (CPU) or an application processor (AP)), or an auxiliary processor 2823 (e.g., a graphics processing unit (GPU), a neural processing unit (NPU), an image signal processor (ISP), a sensor hub processor, or a communication processor (CP)) that is operable independently from, or in conjunction with, the main processor 2821. Any processor herein may comprise processing circuitry. For example, when the electronic device 2801 includes the main processor 2821 and the auxiliary processor 2823, the auxiliary processor 2823 may be adapted to consume less power than the main processor 2821, or to be specific to a specified function. The auxiliary processor 2823 may be implemented as separate from, or as part of the main processor 2821.

The auxiliary processor 2823 may control at least some of functions or states related to at least one component (e.g., the display 28 module 2860, the sensor module 2876, or the communication module 2890) among the components of the electronic device 2801, instead of the main processor 2821 while the main processor 2821 is in an inactive (e.g., sleep) state, or together with the main processor 2821 while the main processor 2821 is in an active state (e.g., executing an application). Any module herein may comprise circuitry. According to an embodiment, the auxiliary processor 2823 (e.g., an image signal processor or a communication processor) may be implemented as part of another component (e.g., the camera module 2880 or the communication module 2890) functionally related to the auxiliary processor 2823. According to an embodiment, the auxiliary processor 2823 (e.g., the neural processing unit) may include a hardware structure specified for artificial intelligence model processing. An artificial intelligence model may be generated by machine learning. Such learning may be performed, e.g., by the electronic device 2801 where the artificial intelligence is performed or via a separate server (e.g., the server 2808). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 2830 may store various data used by at least one component (e.g., the processor 2820 or the sensor module 2876) of the electronic device 2801. The various data may include, for example, software (e.g., the program 2840) and input data or output data for a command related thererto. The memory 2830 may include the volatile memory 2832 or the non-volatile memory 2834.

The program 2840 may be stored in the memory 2830 as software, and may include, for example, an operating system (OS) 2842, middleware 2844, or an application 2846.

The input 28module 2850 may receive a command or data to be used by another component (e.g., the processor 2820) of the electronic device 2801, from the outside (e.g., a user) of the electronic device 2801. The input 28module 2850 may include, for example, a microphone, a mouse, a keyboard, a key (e.g., a button), or a digital pen (e.g., a stylus pen).

The sound output 28module 2855 may output sound signals to the outside of the electronic device 2801. The sound output 28module 2855 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display 28module 2860 may visually provide information to the outside (e.g., a user) of the electronic device 2801. The display 28module 2860 may include, for example, a display, a hologram device, or a projector and control circuitry to control a corresponding one of the display, hologram device, and projector. According to an embodiment, the display 28module 2860 may include a touch sensor adapted to detect a touch, or a pressure sensor adapted to measure the intensity of force incurred by the touch.

The audio module 2870 may convert a sound into an electrical signal and vice versa. According to an embodiment, the audio module 2870 may obtain the sound via the input 28module 2850, or output the sound via the sound output 28module 2855 or a headphone of an external electronic device (e.g., an electronic device 2802) directly (e.g., wiredly) or wirelessly coupled with the electronic device 2801.

The sensor module 2876 (which may include sensing circuitry) may detect an operational state (e.g., power or temperature) of the electronic device 2801 or an environmental state (e.g., a state of a user) external to the electronic device 2801, and then generate an electrical signal or data value corresponding to the detected state. According to an embodiment, the sensor module 2876 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 2877 may support one or more specified protocols to be used for the electronic device 2801 to be coupled with the external electronic device (e.g., the electronic device 2802) directly (e.g., wiredly) or wirelessly. According to an embodiment, the interface 2877 may include, for example, a high definition multimedia interface (HDMI), a universal serial bus (USB) interface, a secure digital (SD) card interface, or an audio interface.

A connecting terminal 2878 may include a connector via which the electronic device 2801 may be physically connected with the external electronic device (e.g., the electronic device 2802). According to an embodiment, the connecting terminal 2878 may include, for example, a HDMI connector, a USB connector, a SD card connector, or an audio connector (e.g., a headphone connector).

The haptic module 2879 may convert an electrical signal into a mechanical stimulus (e.g., a vibration or a movement) or electrical stimulus which may be recognized by a user via his tactile sensation or kinesthetic sensation. According to an embodiment, the haptic module 2879 may include, for example, a motor, a piezoelectric element, or an electric stimulator.

The camera module 2880 may capture a still image or moving images. According to an embodiment, the camera module 2880 may include one or more lenses, image sensors, image signal processors, or flashes.

The power management module 2888 may manage power supplied to the electronic device 2801. According to one embodiment, the power management module 2888 may be implemented as at least part of, for example, a power management integrated circuit (PMIC).

The battery 2889 may supply power to at least one component of the electronic device 2801. According to an embodiment, the battery 2889 may include, for example, a primary cell which is not rechargeable, a secondary cell which is rechargeable, or a fuel cell.

The communication module 2890 may support establishing a direct (e.g., wired) communication channel or a wireless communication channel between the electronic device 2801 and the external electronic device (e.g., the electronic device 2802, the electronic device 2804, or the server 2808) and performing communication via the established communication channel. The communication module 2890 may include one or more communication processors that are operable independently from the processor 2820 (e.g., the application processor (AP)) and supports a direct (e.g., wired) communication or a wireless communication. According to an embodiment, the communication module 2890 may include a wireless communication module 2892 (e.g., a cellular communication module, a short-range wireless communication module, or a global navigation satellite system (GNSS) communication module) or a wired communication module 2894 (e.g., a local area network (LAN) communication module or a power line communication (PLC) module). A corresponding one of these communication modules may communicate with the external electronic device via the first network 2898 (e.g., a short-range communication network, such as Bluetooth™, wireless-fidelity (Wi-Fi) direct, or infrared data association (IrDA)) or the second network 2899 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 2892 may identify and authenticate the electronic device 2801 in a communication network, such as the first network 2898 or the second network 2899, using subscriber information (e.g., international mobile subscriber identity (IMSI)) stored in the subscriber identification module 2896.

The wireless communication module 2892 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 2892 may support a high-frequency band (e.g., the mmWave band) to achieve, e.g., a high data transmission rate. The wireless communication module 2892 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 2892 may support various requirements specified in the electronic device 2801, an external electronic device (e.g., the electronic device 2804), or a network system (e.g., the second network 2899). According to an embodiment, the wireless communication module 2892 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 2897 may transmit or receive a signal or power to or from the outside (e.g., the external electronic device) of the electronic device 2801. According to an embodiment, the antenna module 2897 may include an antenna including a radiating element of or including of a conductive material or a conductive pattern formed in or on a substrate (e.g., a printed circuit board (PCB)). According to an embodiment, the antenna module 2897 may include a plurality of antennas (e.g., array antennas). In such a case, at least one antenna appropriate for a communication scheme used in the communication network, such as the first network 2898 or the second network 2899, may be selected, for example, by the communication module 2890 (e.g., the wireless communication module 2892) from the plurality of antennas. The signal or the power may then be transmitted or received between the communication module 2890 and the external electronic device via the selected at least one antenna. According to an embodiment, another component (e.g., a radio frequency integrated circuit (RFIC)) other than the radiating element may be additionally formed as part of the antenna module 2897. According to various embodiments, the antenna module 2897 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an example embodiment, commands or data may be transmitted or received between the electronic device 2801 and the external electronic device 2804 via the server 2808 coupled with the second network 2899. Each of the electronic devices 2802 or 2804 may be a device of a same type as, or a different type, from the electronic device 2801. According to an embodiment, all or some of operations to be executed at the electronic device 2801 may be executed at one or more of the external electronic devices 2802, 2804, or 2808. For example, if the electronic device 2801 should perform a function or a service automatically, or in response to a request from a user or another device, the electronic device 2801, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 2801. The electronic device 2801 may provide the outcome, with or without further processing of the outcome, as at least part of a reply to the request. To that end, a cloud computing, distributed computing, mobile edge computing (MEC), or client-server computing technology may be used, for example. The electronic device 2801 may provide ultra low-latency services using, e.g., distributed computing or mobile edge computing. In an example embodiment, the external electronic device 2804 may include an internet-of-things (IoT) device. The server 2808 may be an intelligent server using machine learning and/or a neural network. According to an embodiment, the external electronic device 2804 or the server 2808 may be included in the second network 2899. The electronic device 2801 may be applied to intelligent services (e.g., smart home, smart city, smart car, or healthcare) based on 5G communication technology or IoT-related technology.

The electronic device according to various example embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via at least a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various example embodiments as set forth herein may be implemented as software (e.g., the program 2840) including one or more instructions that are stored in a storage medium (e.g., internal memory 2836 or external memory 2838) that is readable by a machine (e.g., the electronic device 2801). For example, a processor (e.g., the processor 2820) of the machine (e.g., the electronic device 2801) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an example embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various example embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments, an electronic device may include a housing including a first housing of a side face and rear face of the electronic device and a second housing slidably coupled to the first housing within a specific range, a heating part disposed to at least one region of the first housing and second housing, a driving unit disposed to one region in the housing, a flexible display of which at least one region is viewable from the outside of the electronic device through the front face of the electronic device and which includes a metal plate, wherein the flexible display includes a first portion exposed to the outside of the housing and a second portion extending from the first portion and inserted into the housing or drawn out to the outside when the second housing moves with respect to the first housing, a support structure attached to a rear face of the second portion, at least one temperature sensor (which may include sensing circuitry) disposed inside the housing, and at least one processor electrically coupled to the heating part, the driving unit, the flexible display, the support structure, or the temperature sensor. The at least one processor may be configured to sense a temperature at a region in which the second portion of the flexible display is disposed through the at least one temperature sensor, determine whether an event for moving the second housing occurs, control a movement speed of the second housing to a first driving speed, if the sensed temperature is greater than or equal to a first temperature at the occurrence of the event for moving the second housing, control the movement speed of the second housing to a second driving speed different from the first driving speed or restrict a movement of the second housing, if the sensed temperature is less than the first temperature at the occurrence of the event for moving the second housing, and supply a first power to at least one of the heating part, the driving unit, the metal plate, and the support structure.

According to various embodiments, the first driving speed may be faster than the second driving speed.

According to various embodiments, the at least one processor may restrict the movement of the second housing, if the event for moving the second housing occurs and the sensed temperature is less than a second temperature below the first temperature.

According to various embodiments, the support structure may include a plurality of bars.

According to various embodiments, the at least one processor may supply a second power higher than the first power to at least one of the heating part, the driving unit, the metal plate, and the support structure, if the event for moving the second housing occurs and the sensed temperature is less than a second temperature below the first temperature.

According to various embodiments, the at least one processor may output a notification depending on the controlling of the second driving speed or the restricting of the second housing.

According to various embodiments, the at least one processor may output a screen indicating that the movement speed of the second housing is controlled to the second driving speed or the movement of the second housing is restricted as the notification through the flexible display.

According to various embodiments, when the at least one processor is performing or be scheduled to perform a function through the heating part, supplying of power to at least one of the driving unit, the metal plate, and the support structure may be restricted.

According to various embodiments, the metal plate may include a pattern structure at the second portion of the flexible display, and the at least one processor may supply the first power to the pattern structure of the metal plate.

According to various embodiments, the electronic device may include at least one of a graphite, a Terminal Interface Material (TIM), and a vapor chamber at a position adjacent to the second portion of the flexible display.

According to various example embodiments, there is provided a method of operating an electronic device including a housing including a first housing and a second housing movable with respect to the first housing, and a flexible display having a first portion exposed to the outside of the housing and a second portion extending from the first portion. The method may include sensing an ambient temperature at a region where the second portion of the flexible display is disposed through a temperature sensor disposed inside the electronic device, determining whether an event for moving the second housing occurs, controlling a movement speed of the second housing to a first driving speed, if the sensed temperature is greater than or equal to a first temperature at the occurrence of the event for moving the second housing, control the movement speed of the second housing to a second driving speed different from the first driving speed or restrict a movement of the second housing, if the event for moving the second housing occurs and the sensed temperature is less than the first temperature, and supplying a first power to at least one of a heating part disposed to at least one region of the first housing and second housing, a driving unit disposed to one region in the housing, a metal plate included in the flexible display, and a support structure attached to a rear face of the second portion.

According to various embodiments, the first driving speed may be faster than the second driving speed.

According to various embodiments, the method may further include restricting the movement of the second housing, if the event for moving the second housing occurs and the sensed temperature is less than a second temperature below the first temperature.

According to various embodiments, the method may further include supplying a second power to at least one of the heating part, the driving unit, the metal plate, and the support structure, if the event for moving the second housing occurs and the sensed temperature is less than a second temperature below the first temperature.

According to various embodiments, the driving unit may include at least one of a roller, bar and/or motor.

According to various embodiments, the method may further include outputting a notification depending on the controlling of the second driving speed or the restricting of the second housing.

According to various embodiments, the method may further include outputting a screen indicating that the movement speed of the second housing is controlled to the second driving speed or the movement of the second housing is restricted as the notification through the flexible display.

According to various embodiments, the method may further include, when the at least one processor is performing or is scheduled to perform a function through the heating part, restricting supplying of the first power to at least one of the driving unit, the metal plate, and the support structure.

According to various embodiments, the metal plate may include a pattern structure at the second portion of the flexible display. The method may further include supplying the first power to the pattern structure of the metal plate.

According to various embodiments, the electronic device may include at least one of a graphite, a Terminal Interface Material (TIM), and a vapor chamber at a position adjacent to the second portion of the flexible display.

The invention claimed is:

1. An electronic device comprising:
a housing comprising a first housing constituting a side face and rear face of the electronic device and a second housing slidably coupled to the first housing within a specific range;
a heating part disposed to at least one region of the first housing and second housing;
a driving unit disposed to one region in the housing;
a flexible display of which at least one region is viewable from the outside of the electronic device through the front face of the electronic device and which comprises a metal plate, wherein the flexible display comprises a first portion exposed to the outside of the housing and a second portion extending from the first portion and inserted into the housing or drawn out to the outside when the second housing moves with respect to the first housing;
a support structure attached to a rear face of the second portion;
at least one temperature sensor disposed at least partially inside the housing; and
at least one processor electrically coupled to at least one of the heating part, the driving unit, the flexible display, the support structure, and the temperature sensor,
wherein the at least one processor is configured to:
determine a temperature at a region in which the second portion of the flexible display is disposed through the at least one temperature sensor;
determine whether an event for moving the second housing occurs;
based on at least determination of the event for moving the second housing, control a movement speed of the second housing to a first driving speed, based on at least the sensed temperature being greater than or equal to a first temperature;
based on at least determination of the event for moving the second housing, control the movement speed of the second housing to a second driving speed different from the first driving speed or restrict a movement of the second housing, based on at least the sensed temperature being less than the first temperature at the occurrence of the event for moving the second housing; and
supply a first power to at least one of the heating part, the driving unit, the metal plate, and the support structure.

2. The electronic device of claim 1, wherein the first driving speed is faster than the second driving speed.

3. The electronic device of claim 1, wherein the at least one processor is configured to restrict the movement of the second housing based on occurrence of the event for moving the second housing and the sensed temperature being less than a second temperature below the first temperature.

4. The electronic device of claim 1, wherein the support structure comprises a plurality of bars.

5. The electronic device of claim 1, wherein the at least one processor is configured to supply a second power higher than the first power to at least one of the heating part, the driving unit, the metal plate, and the support structure, based on occurrence of the event for moving the second housing and the sensed temperature being less than a second temperature below the first temperature.

6. The electronic device of claim 1, wherein the at least one processor is configured to output a notification based on the controlling of the second driving speed or the restricting of the second housing.

7. The electronic device of claim 6, wherein the at least one processor is configured to output a screen indicating that the movement speed of the second housing is controlled to the second driving speed or the movement of the second housing is restricted as the notification through the flexible display.

8. The electronic device of claim 1, wherein the electronic device is configured so that when the at least one processor is performing or is scheduled to perform a function through the heating part, supplying of power to at least one of the driving unit, the metal plate, and the support structure is restricted.

9. The electronic device of claim 1,
wherein the metal plate comprises a pattern structure at the second portion of the flexible display, and
wherein the at least one processor is configured to supply the first power to the pattern structure of the metal plate.

10. The electronic device of claim 1, wherein the electronic device comprises at least one of a graphite, a Terminal Interface Material (TIM), and a vapor chamber at a position adjacent to the second portion of the flexible display.

11. A method of operating an electronic device comprising a housing comprising a first housing and a second housing movable with respect to the first housing, and a flexible display having a first portion exposed to the outside of the housing and a second portion extending from the first portion, the method comprising:
sensing an ambient temperature at a region where the second portion of the flexible display is disposed through a temperature sensor disposed at least partially inside the electronic device;
determining whether an event for moving the second housing occurs;
based on at least determining that the event for moving the second housing occurs, controlling a movement speed of the second housing to a first driving speed, based on at least the sensed temperature being greater than or equal to a first temperature at the occurrence of the event for moving the second housing;
based on at least determining that the event for moving the second housing occurs, controlling the movement speed of the second housing to a second driving speed different from the first driving speed or restrict a movement of the second housing, based on at least the sensed temperature being less than the first temperature; and
based on at least one of the sensed temperature and/or the determining that the event for moving the second housing occurs, supplying a first power to at least one of a heating part disposed to at least one region of the first housing and second housing, a driving unit disposed to one region in the housing, a metal plate included in the flexible display, and a support structure attached to a rear face of the second portion.

12. The method of claim 11, wherein the first driving speed is faster than the second driving speed.

13. The method of claim 11, further comprising restricting the movement of the second housing based on at least the event for moving the second housing occurring and the sensed temperature being less than a second temperature below the first temperature.

14. The method of claim 11, further comprising supplying a second power to at least one of the heating part, the driving unit, the metal plate, and the support structure, based on at least the event for moving the second housing occurring and the sensed temperature being less than a second temperature below the first temperature.

15. The method of claim 11, wherein the driving unit comprises at least one of a roller or motor.

16. The method of claim 11, further comprising outputting a notification depending on the controlling of the second driving speed or the restricting of the second housing.

17. The method of claim 16, further comprising outputting a screen indicating that the movement speed of the second housing is controlled to the second driving speed or that the movement of the second housing is restricted, as the notification through the flexible display.

18. The method of claim 11, further comprising, when the at least one processor is performing or is scheduled to perform a function through the heating part, restricting supplying of the first power to at least one of the driving unit, the metal plate, and the support structure.

19. The method of claim 11, wherein the metal plate comprises a pattern structure at the second portion of the flexible display, and the method further comprising supplying the first power to the pattern structure of the metal plate.

20. The method of claim 11, wherein the electronic device comprises at least one of a graphite, a Terminal Interface Material (TIM), and a vapor chamber at a position adjacent to the second portion of the flexible display.

* * * * *